United States Patent [19]
Carr et al.

[11] Patent Number: 6,052,415
[45] Date of Patent: Apr. 18, 2000

[54] EARLY ERROR DETECTION WITHIN AN MPEG DECODER

[75] Inventors: Jeffery Dean Carr, Vestal; Chuck Hong Ngai, Endwell, both of N.Y.; Charles John Stein, Peckville, Pa.; Ronald Steven Svec, Berkshire, N.Y.

[73] Assignee: International Business Machines Corporation, Armonk, N.Y.

[21] Appl. No.: 08/922,835

[22] Filed: Aug. 26, 1997

[51] Int. Cl.[7] .................................................... H04N 7/32
[52] U.S. Cl. ............................................. 375/240; 348/402
[58] Field of Search ................................. 348/384, 390, 348/400, 401, 402, 403, 409, 415, 416; 382/232, 233, 236, 238; 375/240

[56] References Cited

U.S. PATENT DOCUMENTS

| | | | |
|---|---|---|---|
| 5,014,276 | 5/1991 | Bush et al. ................................. | 714/704 |
| 5,134,478 | 7/1992 | Golin ........................................ | 348/415 |
| 5,373,327 | 12/1994 | McGee et al. ............................ | 348/645 |
| 5,392,129 | 2/1995 | Ohtaka et al. ............................ | 386/48 |
| 5,410,553 | 4/1995 | Choon ....................................... | 348/409 |
| 5,455,629 | 10/1995 | Sun et al. ................................. | 348/402 |
| 5,469,448 | 11/1995 | Denissen et al. ......................... | 714/755 |
| 5,493,343 | 2/1996 | Knutson et al. .......................... | 348/691 |
| 5,910,827 | 6/1999 | Kwan ..................................... | 348/845.1 |

*Primary Examiner*—Bryan Tung
*Attorney, Agent, or Firm*—Heslin & Rothenberg, P.C.

[57] ABSTRACT

An MPEG digital video decoder system, method and computer program product are presented for monitoring decoding of an encoded digital video signal for one or more predefined illegal conditions. Error detection logic is coupled to the variable length (VLC) decoder, inverse quantizer (IQ), inverse discrete cosine transformer (IDCT) and motion compensator (MC) of the decoder for detecting an illegal condition within at least one of the VLC decoder, IQ, IDCT and MC during decoding of the encoded digital video signal. The monitored illegal conditions can include a VLC/IQ control error, an IQ level overrun, and IQ/IDCT buffer error, an MC idle error and an MC macroblock start error. Error signals are reported to a central error register which is monitored periodically by the decoder's control processor. The control processor initiates recovery within the decoder system prior to stoppage of the system due to the illegal condition.

32 Claims, 13 Drawing Sheets

EARLY ERROR DETECTION WITHIN AN MPEG DECODER

TECHNICAL FIELD

The present invention relates generally to digital video signal processing, and more particularly, to early error detection and correction of an illegal process condition within a Moving Picture Experts Group (MPEG) decoder system.

BACKGROUND OF THE INVENTION

The Moving Picture Experts Group (MPEG) MPEG-2 Standard is a compression/decompression standard for video applications. The standard describes an encoded and compressed data stream that has substantial bandwidth reduction. The compression is a subjective loss compression followed by a lossless compression. The encoded, compressed digital video data is subsequently decompressed and decoded in an MPEG-2 Standard compliant decoder.

The MPEG-2 Standard is described in, e.g., C. A. Gonzales and E. Viscito, "Motion Video Adaptive Quantization In The Transform Domain," IEEE Trans Circuits Syst Video Technol, Volume 1, No. 4, Dec. 1991, pp. 374–378, E. Viscito and C. A. Gonzales, "Encoding of Motion Video Sequences for the MPEG Environment Using Arithmetic Coding," SPIE, Vol. 1360, pp. 1572–1576, (1990), D. LeGall, "MPEG: A Video Compression Standard for Multimedia Applications," Communications of the ACM, Vol. 34, No. 4, (April 1991), pp. 46–58, S. Purcell and D. Galbi, "C Cube MPEG Video Processor," SPIE, v. 1659, (1992) pp. 24–29, and D. J. LeGall, "MPEG Video Compression Algorithm," Signal Process Image Commun, v.4, n. 2, (1992), pp. 129–140, among others.

The MPEG-2 Standard specifies a data stream from and a decoder for a very high compression technique that achieves overall image data stream compression not achievable with either intraframe coding alone or interframe coding alone, while preserving the random access advantages of pure intraframe coding. The combination of block based frequency domain intraframe encoding and interpolative/predictive interframe encoding of the MPEG-2 Standard results in a balance between intraframe encoding alone and interframe encoding alone.

The MPEG-2 Standard exploits temporal redundancy for motion compensated interpolative and predictive encoding. That is, the assumption is made that "locally" the current picture can be modeled as a translation of the picture at a previous and/or future time. "Locally" means that the amplitude and direction of the displacement are not the same everywhere in the picture.

The MPEG-2 Standard specifies predictive and interpolative interframe encoding and frequency domain intraframe encoding. It has block based motion compensation for the reduction of temporal redundancy, and block based Discrete Cosine Transform based compression for the reduction of spatial redundancy. Under the MPEG-2 Standard, motion compensation is achieved by predictive coding, interpolative coding, and Variable Length Coded motion vectors. The information relative to motion is based on a 16×16 array of pixels and is transmitted with the spatial information. Motion information is compressed with Variable Length Codes, such as Huffman codes.

The MPEG-2 Standard provides temporal redundancy reduction through the use of various predictive and interpolative tools. Three types of frames or pictures are standard, i.e., "I" Intrapictures, "P" Predicted Pictures, and "B" Bidirectional Interpolated Pictures. Note that for interframe encoding, as IP and IPB encoding, picture transmission order is not the same as picture display order.

Motion compensation goes to the redundancy between pictures. The formation of P Predicted Pictures from I Intrapictures and of B Bidirectional Coded Pictures from a pair of past and future pictures is a key feature of the MPEG-2 Standard technique.

The "I" Intrapictures provide moderate compression, and are access points for random access, e.g., in the case of video tapes or CD ROMS. As a matter of convenience, one "I" Intrapicture is provided approximately every half second that is, every ten to twenty pictures. The "I" Intrapicture only gets information from itself. It does not receive information from a "P" Predicted Picture or "B" Bidirectional Interpolated Picture. Scene cuts preferably occur at "I" Intrapictures.

"P" Predicted Pictures are coded with respect to a previous picture. "P" Predicted Pictures are used as the reference for future pictures, both "P" and "B" pictures. "B" Bidirectional Coded pictures have the highest degree of compression. They require both a past picture and a future picture for reconstruction. "B" bidirectional pictures are never used as a reference.

The motion compensation unit under the MPEG-2 Standard is the Macroblock unit. The MPEG-2 Standard Macroblocks are 16×16 pixels. Motion information consists of one vector for forward predicted macroblocks, one vector for backward predicted macroblocks, and two vectors for bidirectionally predicted macroblocks. The motion information associated with each macroblock is coded differentially with respect to the motion information present in the previous macroblock. In this way a macroblock of pixels is predicted by a translation of a macroblock of pixels from a past or future picture.

The difference between the source pixels and the predicted pixels is included in the corresponding bit stream. The decoder adds a correction term to the block of predicted pixels to produce the reconstructed block.

As described above, each macroblock of a "P" Predicted Picture can be coded with respect to the closest previous "I" Intrapicture, or with respect to the closest previous "P" Predicted Picture.

Further, as described above, each macroblock of a "B" Bidirectional Picture can be coded by forward prediction from the closest past "I" or "P" Picture, by backward prediction from the closest future "I" or "P" Picture, or bidirectionally, using both the closest past "I" or "P" picture and the closest "future " "I" or "P" picture. Full bidirectional prediction is the least noisy prediction.

Motion information is sent with each macroblock to show what part of the reference picture is to be used as a predictor.

As noted above, motion vectors are coded differentially with respect to motion vectors of the previous adjacent block. Variable Length Coding is used to code the differential motion vector so that only a small number of bits are needed to code the motion vector in the common case, where the motion vector for a macroblock is nearly equal to the motion vector for a preceding macroblock.

Spatial redundancy is the redundancy within a picture. Because of the macroblock based nature of the motion compensation process, described above, the MPEG-2 Standard uses a block based method of reducing spatial redundancy. The method of choice is the Discrete Cosine Transformation, and Discrete Cosine Transform coding of the picture. Discrete Cosine Transform coding is combined with weighted scalar quantization and run length coding to achieve still further levels of compression. The Discrete Cosine Transformation is an orthogonal transformation. Orthogonal transformations, because they have a frequency domain interpretation, are filter bank oriented. The Discrete Cosine Transformation is also localized. That is, the encoding process samples on an 8×8 spatial window which is sufficient to compute 64 transform coefficients or sub-bands.

Another advantage of the Discrete Cosine Transformation is that fast encoding and decoding algorithms are available. Additionally, the sub-band decomposition of the Discrete Cosine Transformation is sufficiently well behaved to allow effective use of psychovisual criteria.

After Discrete Cosine transformation, many of the higher frequency coefficients are zero. These coefficients are organized into a zig-zag pattern and converted into run-amplitude (run-level) pairs. Each pair indicates the number of zero coefficients and the amplitude of the non-zero coefficient. This is coded in a Variable Length Code.

Discrete Cosine Transformation encoding is carried out in three stages. The first stage is the computation of the Discrete Cosine Transformation coefficients. The second step is the quantization of the coefficients, and the third step is the conversion of the quantized transform coefficients into run-amplitude pairs after reorganization of the data into zig-zag scanning order.

Quantization can be viewed as a shift right by several bits. Quantization enables very high degrees of compression, and a high output bit rate, and retains high picture quality.

Quantization can be adaptive, with "I" Intrapictures having fine quantization to avoid "blockiness" in the reconstructed image. This is important because "I" Intrapictures contain energy at all frequencies. By way of contrast, "P" and "B" pictures contain predominantly high frequency energy and can be coded at a coarser quantization.

Further details of the MPEG Standard, and in particular MPEG decoder design, are available from commonly assigned, co-pending U.S. patent application Ser. No. 08/618,660, entitled "Memory Management For An MPEG2 Compliant Decoder", which is hereby incorporated herein by reference.

One problem identified by applicants in implementing an MPEG decoder design results from, for example, a corrupt encoded stream. While processing macroblock data through the decoder, several blocks of data can be contained in the decode pipeline at any one time. If a problem occurs, one either caused by a corrupt encoded stream, an interruption to the decode system itself, or a problem within the hardware logic of the decoder, the problem can go largely undetected until it manifests itself in the form of corruption to the picture or even a "hang" (i.e., stoppage) condition to the decoder system. In order to recover from such a system "hang", it would be necessary to reset and restart the entire decoder. This type of catastrophic failure and the resultant restart recovery process is clearly an undesirable option for decoder customers. The present invention is directed to avoiding this particular problem by providing early detection of an illegal condition within the decode process.

DISCLOSURE OF INVENTION

Briefly summarized, the invention comprises in one aspect an MPEG digital video decoder system for decoding an encoded digital video signal. The decoder system includes a Variable Length Code (VLC) decoder, an Inverse Quantizer (IQ), a Discrete Cosine Transform Inverter (IDCT) and a Motion Compensator (MC). The VLC decoder receives encoded data of the encoded digital video signal and produces therefrom decoded data. The IQ is coupled to the VLC decoder for dequantizing the decoded data to produce dequantized, decoded data. The IDCT is coupled to the IQ for transforming the dequantized, decoded data from frequency domain to spatial domain. The spatial domain, dequantized decoded data includes difference data. The MC receives reference data of the encoded digital video signal, and the difference data from the IDCT is added thereto to form motion compensated pictures. The decoder system further includes error detection logic coupled to at least one of the VLC decoder, IQ, IDCT and MC for detecting an illegal condition occurring during decoding of the encoded video signal and for signalling an error upon detecting the illegal condition.

Preferably, logic is provided for monitoring multiple potential illegal conditions which may occur during decoding of the encoded digital video signal. These multiple illegal conditions can include a VLC decoder table error in an open, "fixed length" table, a VLC/IQ control error, an IQ level overrun, an IQ/IDCT buffer error, an MC idle error, and an MC macroblock start error. Upon identifying an illegal condition, the error detection logic preferably forwards an error signal to an error register, which is periodically monitored by a processor within the MPEG digital video decoder system. The processor includes microcode for taking appropriate corrective action upon receipt of an error signal at the error register.

Corresponding methods for decoding an encoded digital video signal, as well as computer program products for accomplishing the decoding of the encoded digital video signal while employing early error checking in accordance with this invention, are also described and claimed herein.

To restate, presented herein are various types of error checking logic for use in a decoder system such as an MPEG video decoder. Error detection in accordance with the invention provides an ability to detect errors early in their onset so that recovery procedures can be implemented to minimize observable impact to the decoded picture. Further, protection is provided against errors accumulating and causing catastrophic failures such as would manifest themselves as picture corruption or stoppage of the decoding process. Errors are detected originating in either the compressed data or caused by decoder hardware malfunctions. Further, error detection logic is described for insuring that the decoder units are processing the correct macroblock at a particular time. The particular error detection logic described detects VLC table errors, IQ control errors, IQ level overruns, IQ/IDCT buffer errors, MC idle errors and/or MC macroblock start errors.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which:

FIG. 6b is a block diagram of calculation logic for determining the DCT coefficient index employed in the error detection logic of FIG. 6a;

BEST MODE FOR CARRYING OUT THE INVENTION

A conventional decoder system, method and apparatus receives coded, compressed digital video data from a host interface bus, decompresses and decodes the digital video data, and delivers decompressed, decoded digital video data through a display interface, also referred to as a pixel bus. Conversion from digital data to analog data is done externally of the system, although a digital to analog converter can be incorporated into the system downstream of the pixel bus.

In a preferred embodiment of the invention, the decoder system complies fully with the Moving Picture Experts Group MPEG-2 Standard Main Profile at the Main Level, as defined in the MPEG documentation. Thus, the decoder system can receive compressed video data at a rate of 15 Mbs/sec, and the system can operate at a 40 MHz clock frequency. In the MPEG-2 Standard, the data format for the compressed, encoded data is YCbCr (4:2:0).

Figure 1:
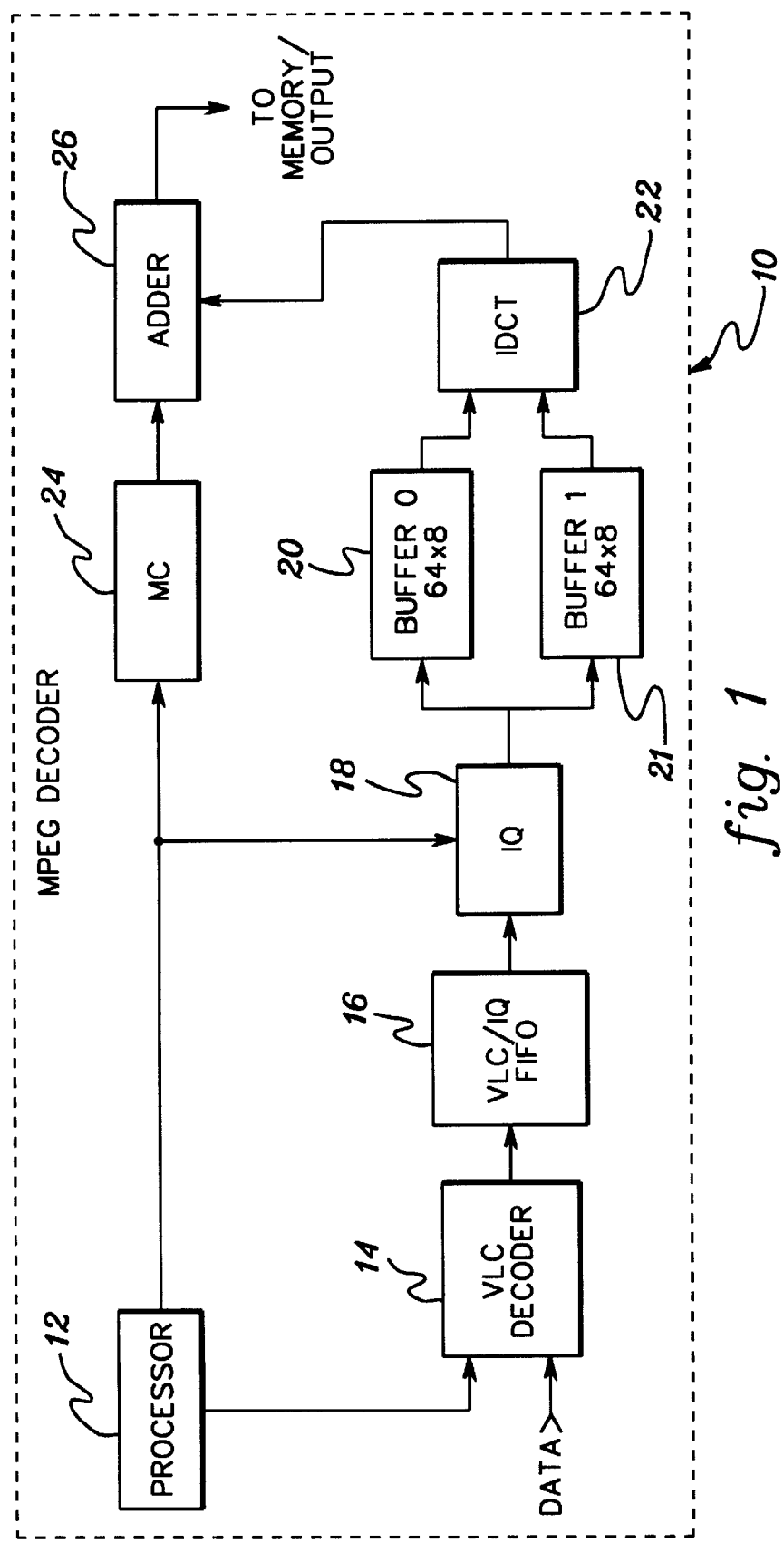
FIG. 1 is a block diagram of selected units of an MPEG decoder system to implement the present invention.

FIG. 1 shows relevant subunits of an MPEG decoder, generally denoted 10, implementing the present invention. MPEG decoder 10 decompresses compressed input data received from a host interface bus (not shown) and provides output video data to memory or directly to an interlaced display unit. Decode unit 10 includes a processor or controller 12 (with an associated instruction storage unit (not shown)), which is coupled to a variable length code (VLC) decoder 14, such as a Huffman decoder. VLC decoder 14 is also coupled to receive encoded data of the data stream, for example, from a DRAM memory within the decoder. The received data stream is decoded within decoder 14 and forwarded across a VLC/inverse quantizer first-in first-out (FIFO) buffer 16 to an inverse quantizer (IQ) 18 where dequantization of the decoded data occurs. The dequantized code is fed across two buffers, buffer 0 (20) & buffer 1 (21) to an inverse discrete cosine transform unit 22.

The IQ receives run-level coded symbols from the VLC decoder and outputs blocks of 64 coefficients, which are sent to the IDCT unit alternately across buffer 0 & buffer 1. The IDCT forms a reconstructed image block and forwards the results to a motion compensation (MC) unit 24. The MC unit, after performing the required interpolations to form predicted image blocks, synchronizes them and adds them via adder 26 to the reconstructed blocks from the IDCT. The decompressed image blocks are then stored to memory where they are accessed by the display unit. Again, those skilled in the art will understand that FIG. 1 depicts only selected components of an MPEG decoder relevant to the particular implementations of the present invention described herein.

Processor or controller 12 is a central point of control for the decoder. The processor's 12 microcode can be stored in an instruction storage unit (not shown) and the processor/controller interacts with the host system through an external processor through the host or system bus for high level commands and status. The processor is responsible for the control and command of other functional elements of the decoder, as well as providing global synchronization of these units.

As noted briefly above, various inventive techniques are provided herein directed to monitoring for certain illegal conditions or errors within the MPEG decoder, and in particular, within the subunits depicted in FIG. 1. The pipeline components addressed by error detection logic in accordance with the present invention include the variable length code (VLC) decode, the inverse quantization (IQ), the inverse discrete cosine transform (IDCT), and the motion compensation (MC) units. If any of the errors identified occur, the detection logic will capture that condition and notify the microcode process running in processor 12 so that the microcode can initiate a proper error recovery process using recovery techniques known in the art.

In accordance with this invention, six errors are identified as potentially precipitating a hang or stoppage condition within the decoder pipeline. These errors include: a VLC decode table error, an IQ control error, an IQ level overrun, an IQ/IDCT buffer error, an MC idle error, and an MC macroblock start error. Identification of each of these errors is discussed further below in connection with FIGS. 2a–9 hereof, wherein the same reference numbers used throughout multiple figures designate the same or similar components. Note that one skilled in the art can readily implement hardware detection logic to identify each of the error conditions presented herein.

VLC Decode Table Error

The variable length code Huffman decoder 14 contains tables for decoding the data stream and a local state machine that controls the decoding of run-level data for the macroblocks. The VLC decoder 14 is controlled by processor 12 as header information and block run-level symbols are passed from the compressed bit stream. A local state machine decodes the run-level symbols and interacts with the IQ 18 to process the decoded signals.

To be noted is that variable length coding, for example, Huffman coding, is a statistical coding technique that assigns codewords to symbols. Symbols with a high probability of occurrence are assigned short codewords, while symbols with a low probability of occurrence are assigned longer codewords.

The codes used in the MPEG-2 VLC decoder are taken from the MPEG-2 Standard. The codes form a class of codes know as prefix codes. In a prefix code system, no valid code is a prefix of another code. The number of bits assigned to each codeword is variable, from a minimum of 1 to a maximum of 16. The code bits used to represent a sequence of symbols can be a variable length string of bits. This bit string must be decoded sequentially in order to reconstruct the original sequence of symbols. As noted above, Huffman coding generates code tables based on symbol occurrence probabilities. The codes generated are minimum redundancy codes. The Huffman coding used by the MPEG Standard is based on a statistic coding algorithm. The coding procedure used by Huffman coding is lossless coding, because the exact sequence of symbols encoded is recovered by the decoding process.

In accordance with the present invention, the VLC decoder 14 generates an error signal when a VLC table and is selected and there is not a valid decode within the table for the particular string of bits to be decoded. Through hardware logic, the identified error can then be used to set a latch in a designated error register.

Tables 1, 2 & 3 below represent various conventional VLC decode tables employed by unit 14.

TABLE 1

Macroblock Type I Picture Table

| MB type VLC code | decoded value* |
|---|---|
| 1 | 0 0 0 0 0 1 |
| 01 | 1 0 0 0 0 1 |

*The "decoded value" bits represent (from left to right): macroblock (MB) quant, MB motion vector forward, MB motion vector backward, MB coded block pattern, and MB intrablock.

TABLE 2

DMV table

| DMV code | decoded value |
|---|---|
| 11 | −1 |
| 0 | 0 |
| 10 | +1 |

TABLE 3

MPEG 2 Level Escape Code Table

| Fixed length code | Level |
|---|---|
| 1000 0000 0000 | 2048 Forbidden ** |
| 1000 0000 0001 | 2047 |
| 1000 0000 0010 | 2046 |
| . . . | . . . |
| 1111 1111 1111 | −1 |
| 0000 0000 0000 | 0 Forbidden ** |
| 0000 0000 0001 | +1 |
| . . . | . . . |
| 0111 1111 1111 | 2047 |

In the above tables, Table 1 depicts an example of an open table wherein values are variable length coded, Table 2 depicts a closed table again with values variable length coded, and Table 3 presents an open table with fixed length variables. Tables 1 & 3 comprise open tables which can be checked for invalid entries, while data of the closed Table 2 cannot be checked.

Figure 2A:
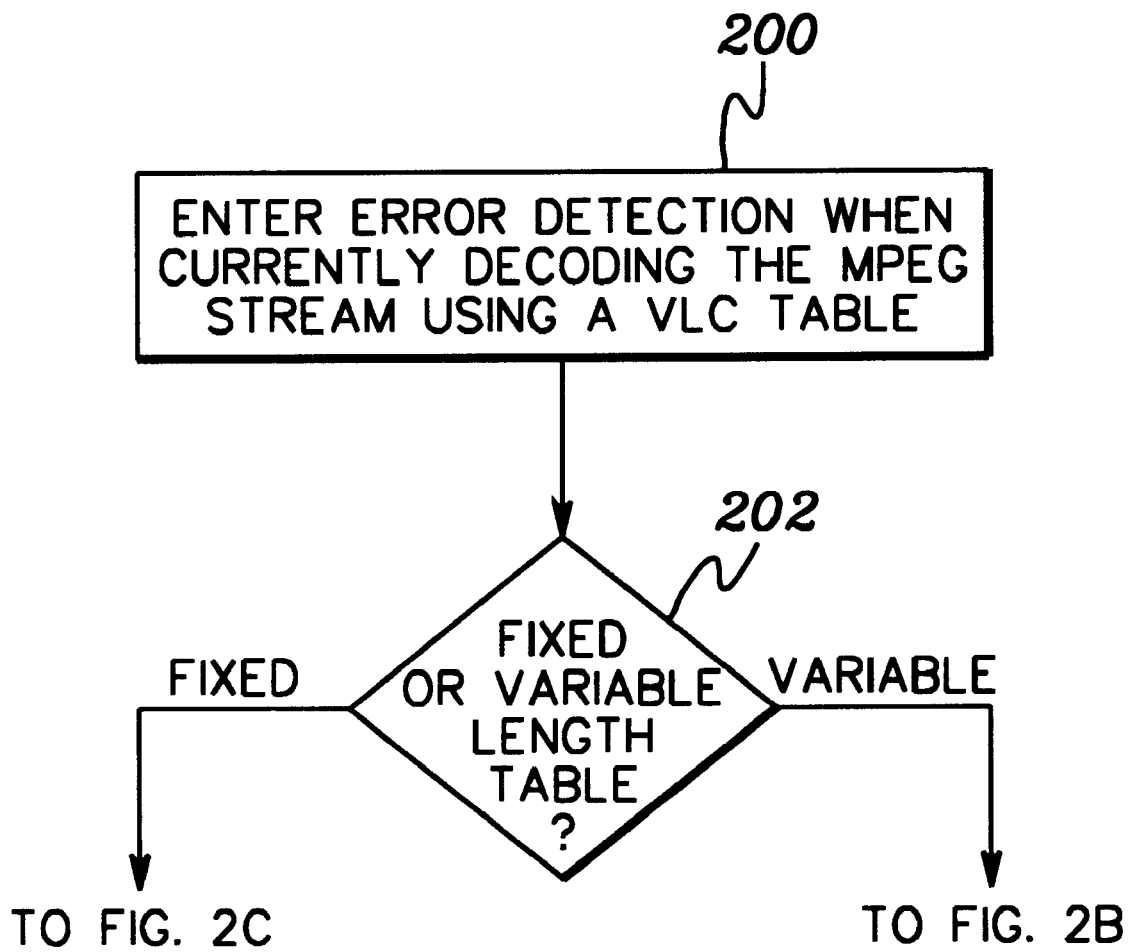
FIGS. 2a, 2b & 2c are a flowchart of one embodiment of VLC table error detection logic in accordance with the present invention.
Figure 2B:
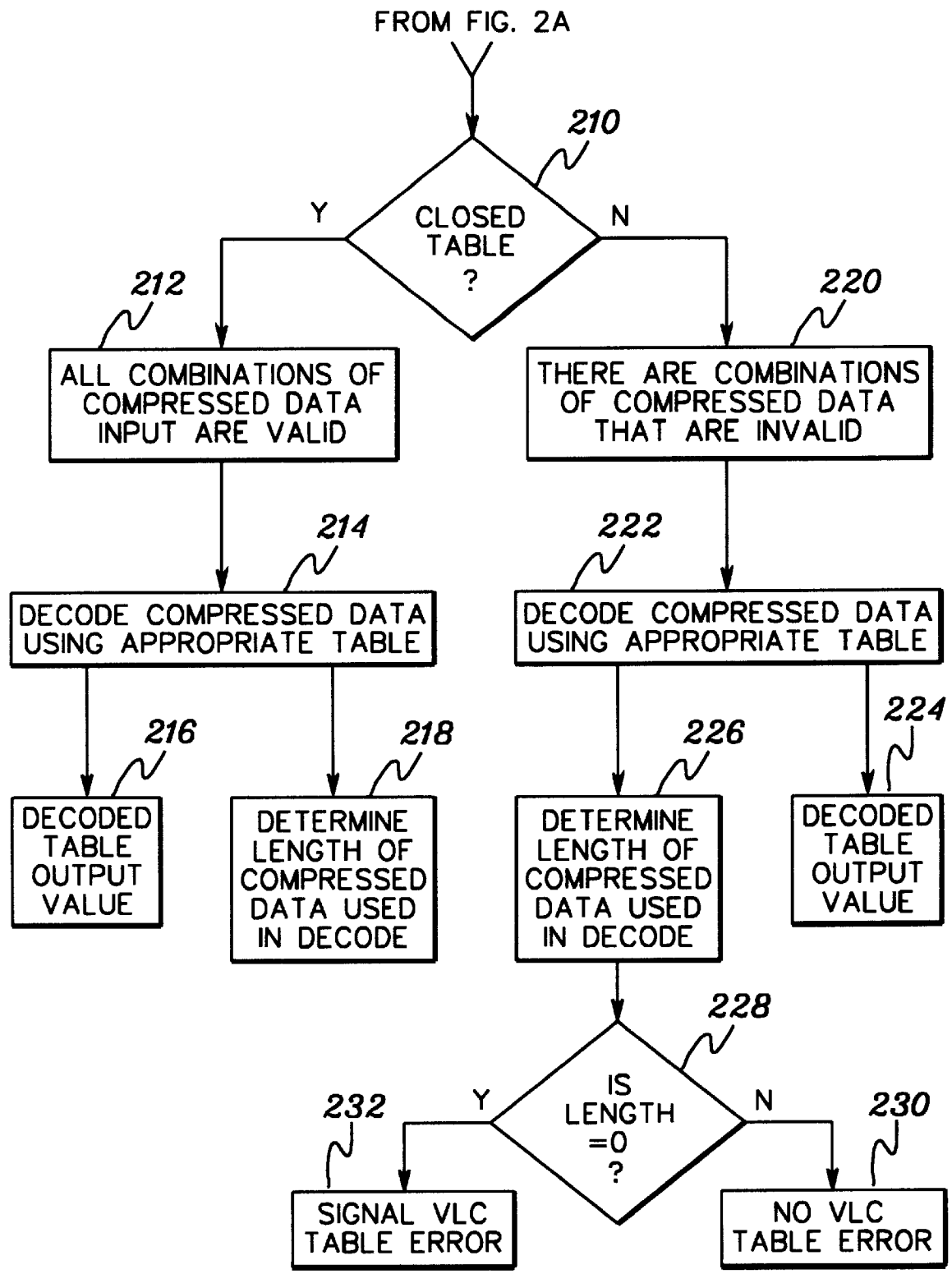
Figure 2C:
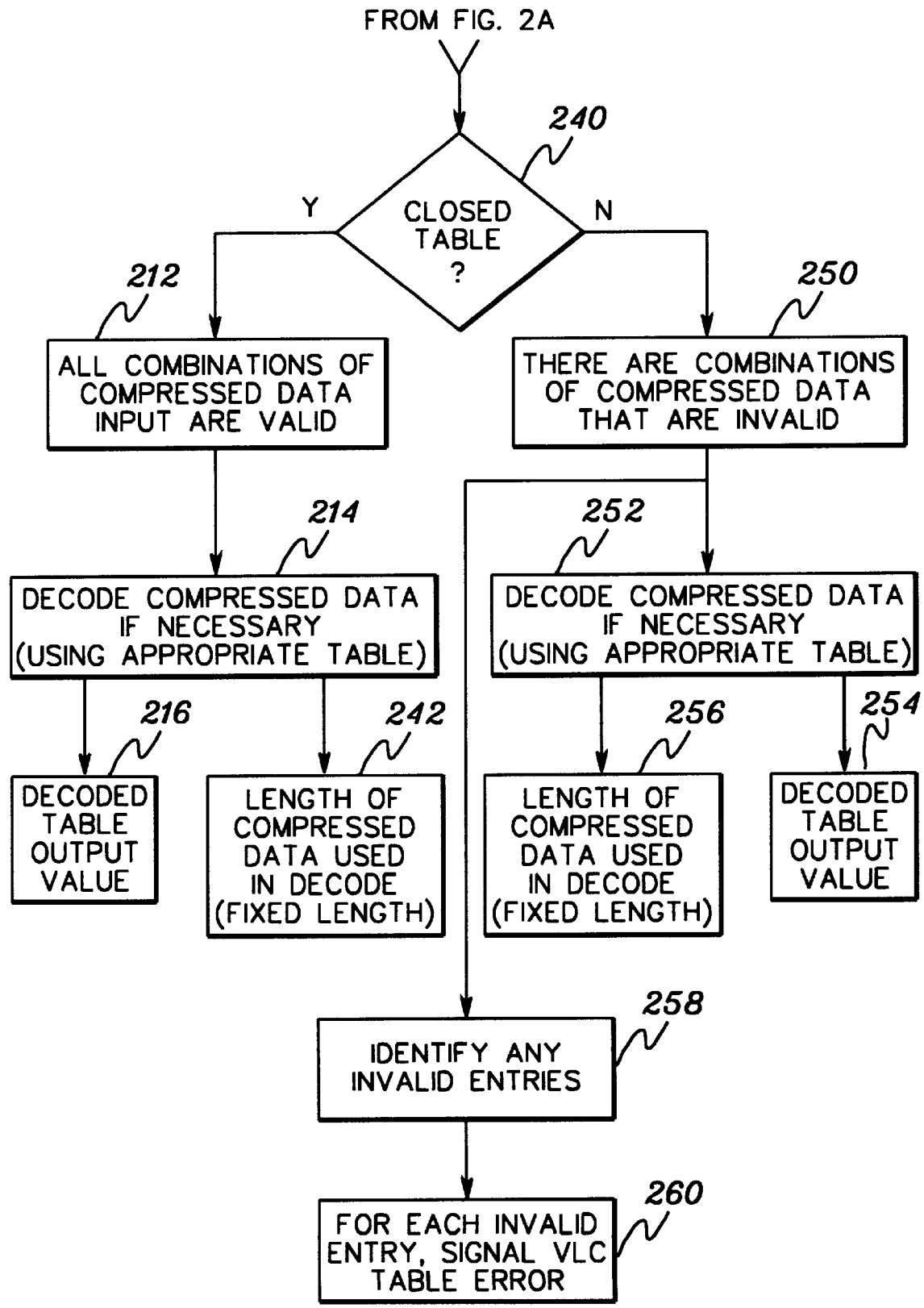

FIGS. 2a, 2b & 2c depict one embodiment of decoder table error detection logic in accordance with this invention. As shown in FIG. 2a, table error detection is entered when currently decoding an MPEG data stream using a VLC decode table 200. Inquiry is made whether the table in use employs fixed length variables or variable length variables 202. If variable length, then the processing flow is to FIG. 2b, while if fixed length, the processing of FIG. 2c is employed.

In FIG. 2b, logic initially determines whether the subject VLC table comprises a closed table 210. If so, then all combinations of the compressed data input must be valid 212 and the compressed data is decoded using the appropriate table entry 214. The decoded table value is output 216, as well as the length of compressed data used in the decode 218. The length of the compressed data used in the decode indicates how many bits were just decoded. The VLC decoder uses this information to discard the just decoded bits to reach the next string of bits to be decoded. Again, if the VLC table at issue is closed, there must be a valid data entry for each combination of compressed data and further error checking is not possible.

If the VLC decode table comprises an open table, then there are combinations of compressed data that would be invalid 220 and the current compressed data (i.e., current string of bits) is decoded using the appropriate table entry 222. Output from the decoding function is the decoded output value 224, as well as a length of compressed data used in the decode function 226. Again, the length of compressed data used in the decode operation indicates how many bits of the data stream are to be discarded due to the current decode.

Additionally, this information is employed in accordance with the present invention to determine whether a valid decode has occurred. Inquiry is made whether the length of the compressed data used in the decode is zero 228. Each valid decode requires a length of data of one or more bits to be used in the decode operation. If the number of bits equal zero, then there is no valid decode and a VLC table error is signaled 232. As described further below, this signal can be by way of setting a corresponding location in a predefined "illegal condition" or error register disposed within the MPEG decoder 10 (FIG. 1) at a location accessible by the processor 12 (FIG. 1). For example, the register of error values could be located within the VLC decoder 14. If the length is greater than zero, then no table error has occurred 230.

If the VLC decode table at issue comprises a fixed table, then the processing of FIG. 2c is employed. Initially, the error logic inquires whether the VLC table comprises a closed table 240. If "yes", then all combinations of compressed data input are valid 212, and the compressed data is decoded using the appropriate table entry 214 as in the processing of FIG. 2b. The decoded entry is output 216, as well as the length of the compressed data used in the decode operation 224. Since this is a "fixed length" table, the length of data used in the decode is constant. This fixed length of data is discarded from the bit stream with each decode, thereby obtaining the next string of data for processing.

If the table is an open table, then there are combinations of compressed data that are invalid 250. The compressed data is decoded if necessary using the appropriate table entry 252, with the decoded table value again being output 254 along with the length of the compressed data used in the decode operation 256 (which by definition is fixed). Additionally, logic is provided to identify invalid table entries 258 and for each identified invalid table entry, a VLC table error is signaled 260. Identification of an error can be accomplished by checking for the "forbidden" table entries. As shown in Table 3, there may be several fixed length bit codes for which there is no corresponding valid entry in the table, i.e., the given fixed length code is a "forbidden" entry. This identification can be accomplished using simple checking logic for specific invalid entries or ranges of invalid entries.

As noted briefly above, the VLC/IQ FIFO passes AC coefficient data from the VLC decoder to the IQ for each block of a macroblock. The VLC decoder and/or the processor can be implemented with logic to insure that the correct amount of blocks for each macroblock will be given to the IQ when a VLC decode table error is detected. This will allow synchronization between the two units to be maintained notwithstanding the detection of the VLC decode table error. For a system in which the processor controls the VLC decoder, this also allows the processor to complete the macroblock normally. The processor then interrogates the error register upon completion of the macroblock.

IQ Control Error

As shown in FIG. 1, the inverse quantizer 18 receives run/level (run/amplitude) coded symbols from the VLC decode unit 14 and outputs a block of 64 coefficients that are sent to the inverse discrete cosine transform unit 22. The inverse quantizer 18 converts the run/level coded symbols to zeros and symbols, unzigs the data, handles differential pulse code modulation (DPCM) decoding for the discrete cosine coefficients, and dequantizes the data.

Figure 3:
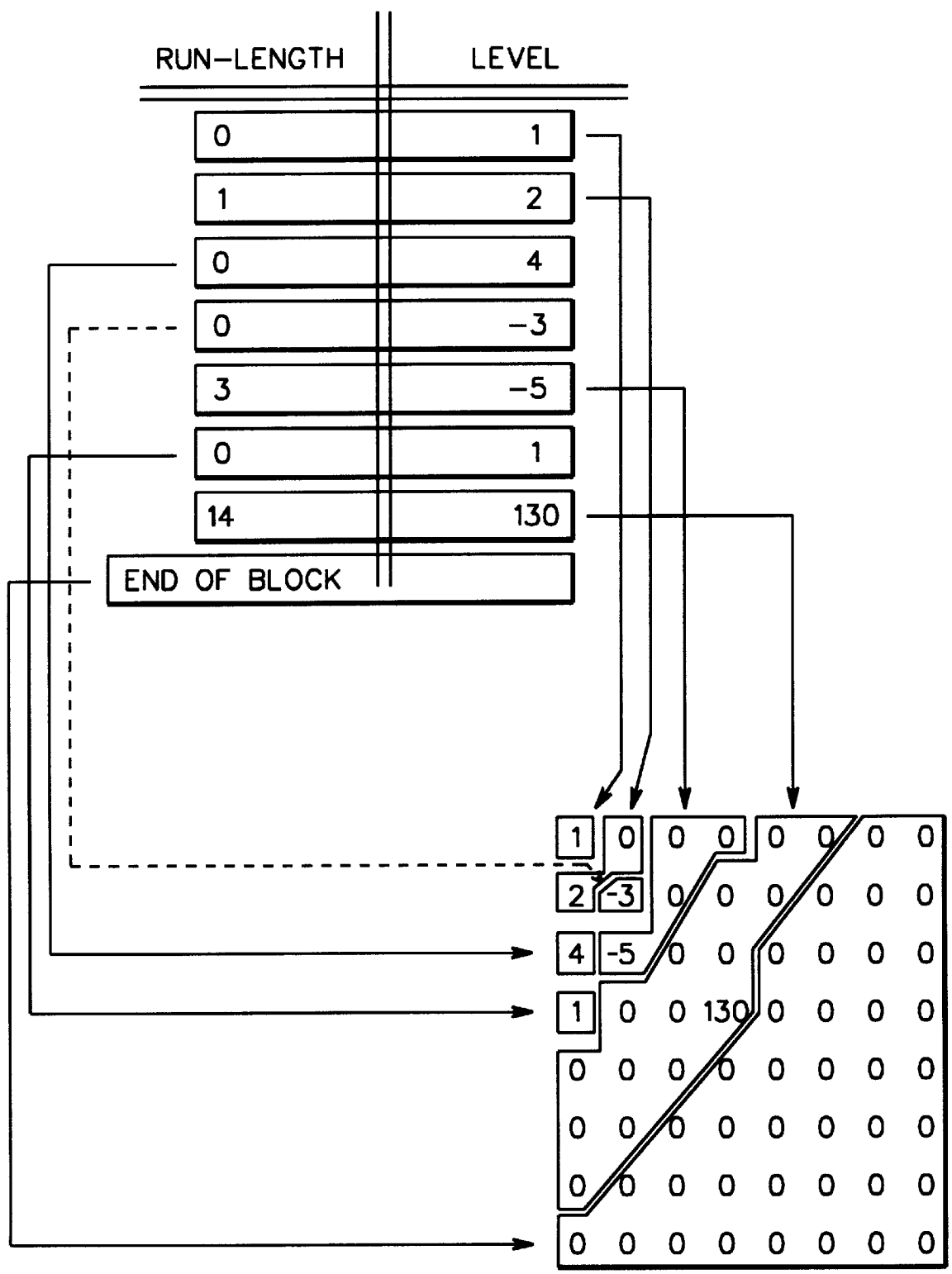
FIG. 3 is a depiction of run-length level data interpretation in accordance with MPEG Standard.

FIG. 3 is an example of a zig-zag scanning order of the discrete cosine transform coefficients. The top left coefficient is the DC coefficient while all other coefficients are considered AC terms. The run length indicates the offset from the upper left corner along the zig-zag scanning order, while the level indicates the value of the specified coefficient.

For every block of data, which typically contains 64 coefficients, the IQ generates a block of data to send to the IDCT. Since each block can have numerous coefficients that are zero, the run lengths are used to indicate which coefficient positions are zero and thereby which positions can be skipped. The level values are dequantized and placed in the appropriate non-zero positions.

In quantization (that is, in encoding), the level is divided by a number called the "quantization factor," thereby becoming a quantized coefficient. Quantization and dequantization introduce some degree of loss into the decoded data. In the decoding process, the unzigged quantized coefficient ("level") will be multiplied by the quantization factor to produce a dequantized coefficient. The quantization factor is used by the decoder to decode the data stream, and is part of the incoming data stream to the decoder. This coefficient, a frequency domain value, will go to the inverse discrete cosine transform unit 22 to be transformed back to a spatial domain based signal.

Intrablocks contain DC coefficients that are differential pulse code modulated code. This means that the DC value of the previous value predicts the current 8 by 8 block DC value. The quantized difference is then coded. The differential pulse code modulation coding for the DC coefficient is applicable for all three components, i.e., the Y component, the Cb component and the Cr component. After differential pulse code modulation decoding, the DC coefficients of the 8 by 8 block will go through the inverse quantization process before being sent to the inverse discrete cosine transform unit 22.

Figure 4:
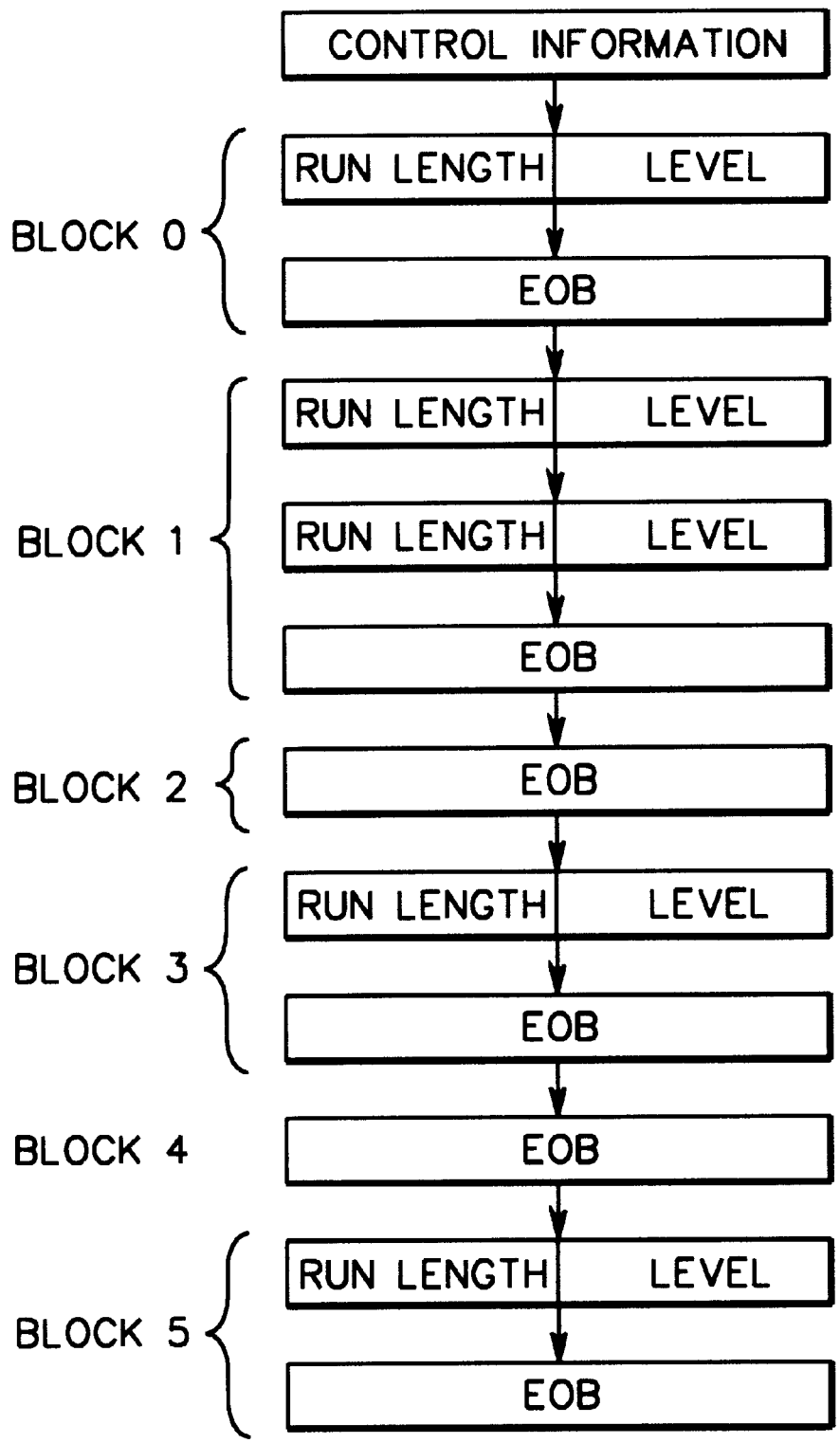
FIG. 4 is a diagram of one 4:2:0 chromo formatted macroblock of data to pass through the VLC/IQ interface.

The interface between the VLC decode and IQ is preferably implemented with a FIFO 16 which transmits not only the run-length and level data, but also for each macroblock, a line of data which contains control parameters to be used for the macroblock. As shown in FIG. 4, this line of data comprises control information. A line of control information is provided at the beginning of each macroblock. The macroblock is divided into multiple blocks, for example, 6 blocks for 4:2:0 chroma format as shown in FIG. 4, with each block of data having a varying amount of data. Each block ends with an "end of block" (EOB) indication.

Since the same FIFO is used to transfer both control information and run-length/level data to the IQ, hardware detection logic is preferably added in accordance with the present invention to identify whether data from the buffer is control information, run-length/level or EOB information. For example, this can be accomplished by enlarging the buffer by one bit to provide an extra bit at the beginning of each line of data. This extra bit can then be used as an indication from the VLC decoder whether the data comprises control information or run-length/level data. If the data comprises control information, then the extra bit might be set to a "one" value. By forwarding this information from the VLC decoder, the IQ is able to compare the received signal from the VLC decoder with its own internal tracking of the macroblocks to ensure that control information, run-length/level data or EOB is not being unexpectedly received. Invalid control information from the FIFO can produce a corrupted picture, as well as possibly result in "hanging" the pipeline if an EOB is missed.

IQ control error logic can be implemented in hardware within the IQ for activation when the IQ reads data from the VLC decoder by way of the VLC/IQ FIFO. A control error signal is generated when either the IQ is expecting to receive a control line from the FIFO and does not receive a control valid bit signal or when the IQ is expecting to read run-length/level or EOB data from the FIFO and the associated control valid bit is active, for example, active erroneously. If the IQ detects such a control line transfer error, then it will report, i.e., signal, an IQ control error to the error register, which as noted above and described further below may be implemented within the VLC decoder for monitoring by the processor.

Figure 5:
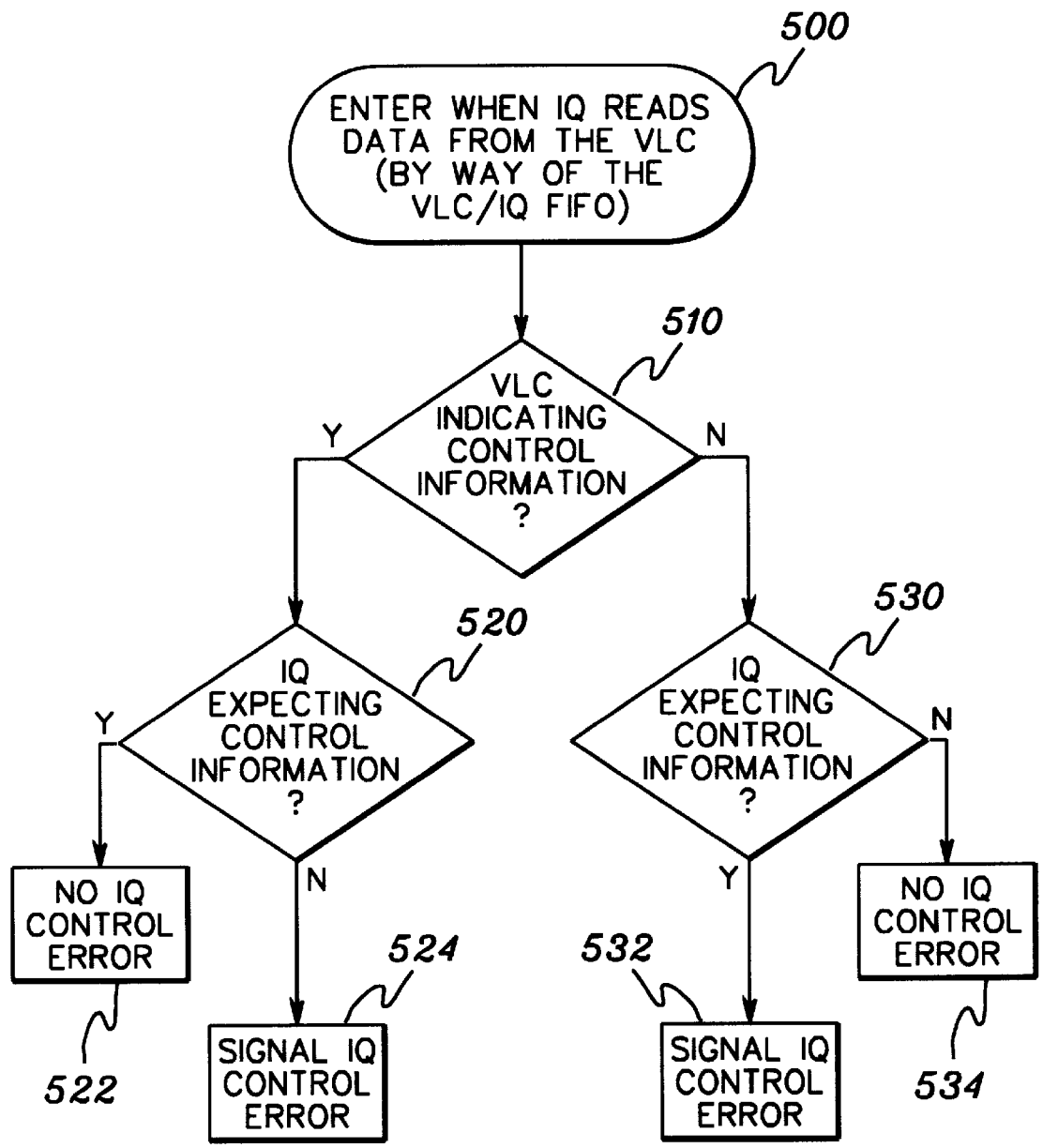
FIG. 5 is a flowchart of one embodiment of IQ control error detection logic in accordance with the present invention.

FIG. 5 depicts one embodiment of the processing logic which can be implemented within the IQ for detection of this error. This processing is entered whenever the IQ reads data from the VLC decoder by way of the VLC/IQ FIFO buffer 500, where it initially determines whether the VLC decoder is indicating that the data is control information 510 (i.e., Is the extra bit set?). If "yes", then the logic determines whether the IQ is expecting control information 520. Once initialized, the IQ can independently determine when control information is expected since the control information will be the first line of each macroblock of data. When a given macroblock of data is complete, i.e., when the EOB of the last block is reached, then the IQ is expecting control information for the next macroblock. In this logic flow, if the IQ is expecting control information and has received control information, then no IQ control error has occurred 522. Otherwise, an IQ control error is signaled 524 and an appropriate latch in the error register is set.

If the VLC decoder is not indicating that the present line of data comprises control information, then the logic inquires whether the IQ is expecting control information. If so, then an IQ control error is signaled to the error register 532. However, if the IQ is not expecting to receive control information, then no IQ control error has occurred 534.

IQ Level Overrun

Figure 6A:
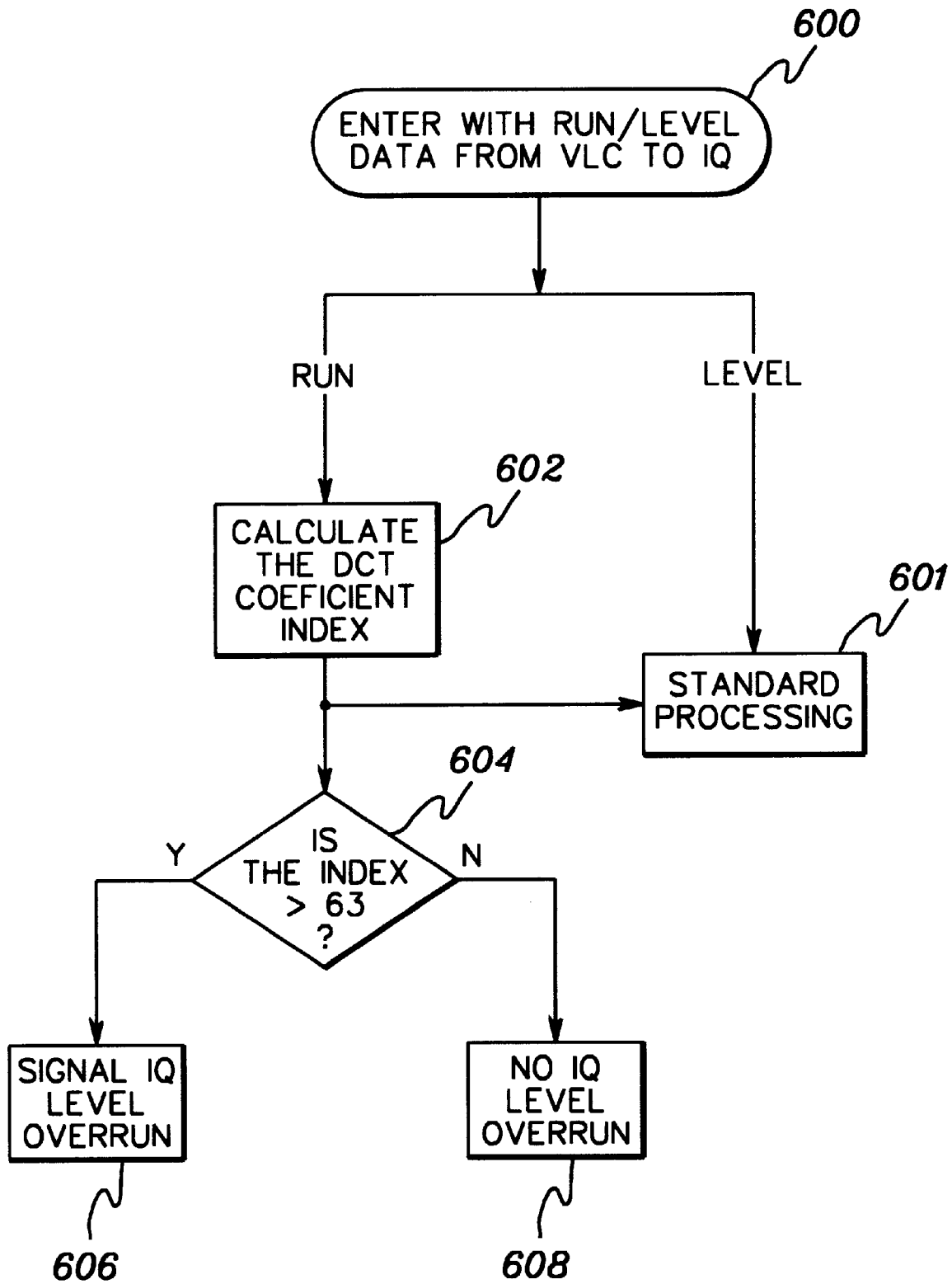
FIG. 6a is a flowchart of one embodiment of IQ level overrun detection logic in accordance with the present invention.
Figure 6B:
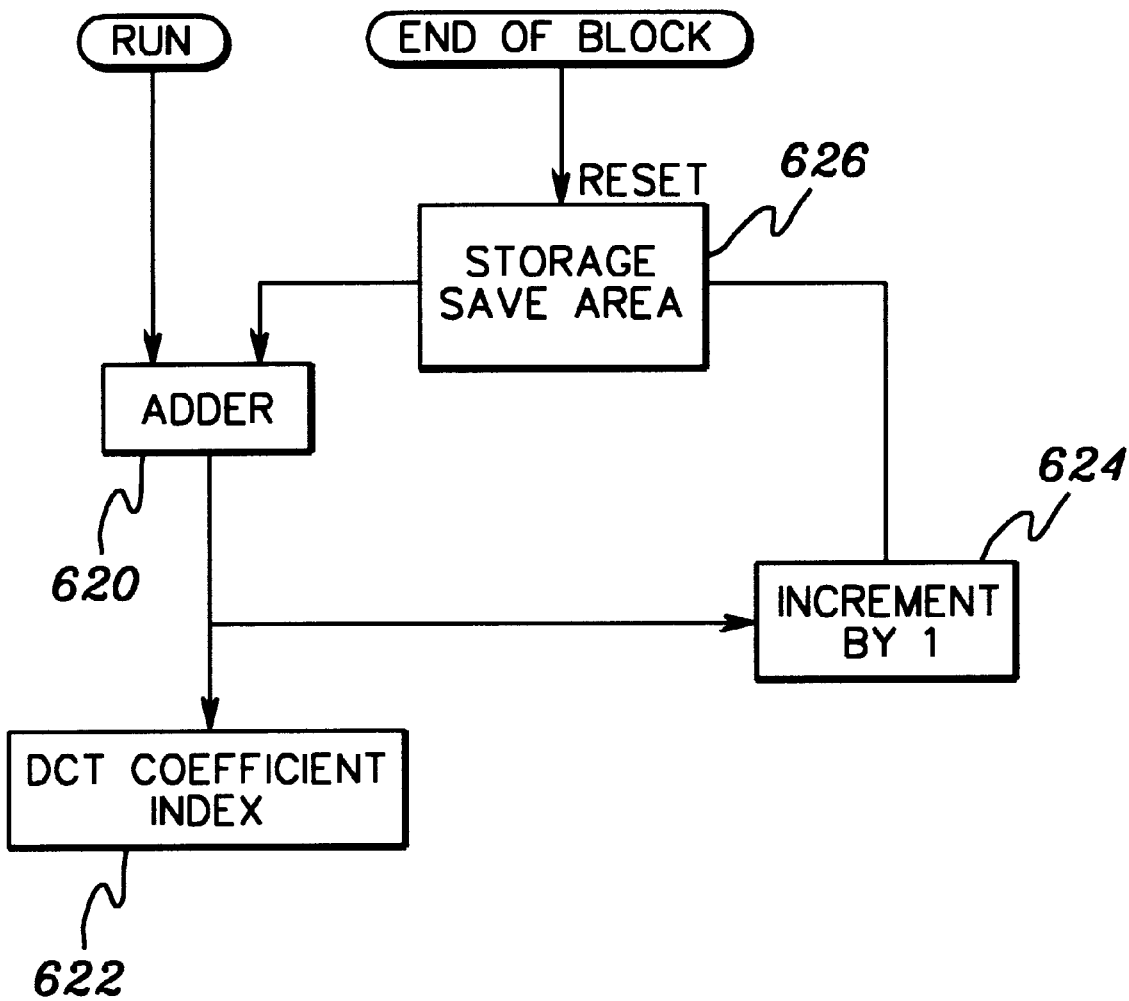

In order to prevent overwriting of data that has been calculated and placed in buffers for the IDCT, logic detection is preferably added in the IQ to track the coefficients coming from the VLC decoder (via run-length/level translation). Each block of data being processed can have up to 64 coefficients. The run-lengths are used to indicate the distance between non-zero coefficients. The IQ uses the run-lengths to calculate a DCT coefficient index which indicates which of the 64 coefficients is being processed. This index has values of 0 to 63. Should the index ever exceed 63, an overrun has occurred and the error detection logic signals an IQ level overrun back to the error register. An end of block (EOB) indicates that all data for a particular block has been received and will reset the DCT coefficient index. FIGS. 6a & 6b depict processing logic to accomplish this function.

Level overrun detection begins with run/level data receipt from the VLC decode 600. Level data receives standard processing 601, while the run data is used to first calculate the current DCT coefficient index 602. This coefficient index is then examined to determine whether the index is greater than 63 on a scale of 0 to 63 (604), which in this 64 coefficient example means that there is an overrun error. If the index is greater than 63, then IQ level overrun is signaled back to the error register 606. Otherwise, no IQ level overrun has occurred 608.

Overrun can be monitored as depicted in FIG. 6b. In particular, the run is added by an adder 620 to the previous index which is held within a storage save area 626. The output of adder 620 comprises the current DCT coefficient index 622. Once determined, the new or current index is incremented by "1" 624 and returned to the storage save area 626 for use in determining a next DCT coefficient index. Once the end of block is reached, the EOB resets to zero the index then held within the storage save area 626.

IQ/IDCT Buffer Error

As each block of data is dequantized by the IQ, it is loaded into one of two or more output buffers to be subsequently read by the IDCT. The IQ loads each of these buffers, e.g., buffer 0 & buffer 1 (FIG. 1), in alternate order and the IDCT reads the information similarly. If due to some error the buffer pointer being read by the IDCT does not match the buffer which it should be reading from according to the IQ, then output of the decoder system could be corrupted. To detect this error between the two macros, hardware logic can be added in the IQ unit to maintain the buffer pointer to that buffer which the IDCT should be reading. Then, if the IDCT reads a different buffer than expected, the IQ can report this illegal condition to the processor via the error register.

Figure 7:
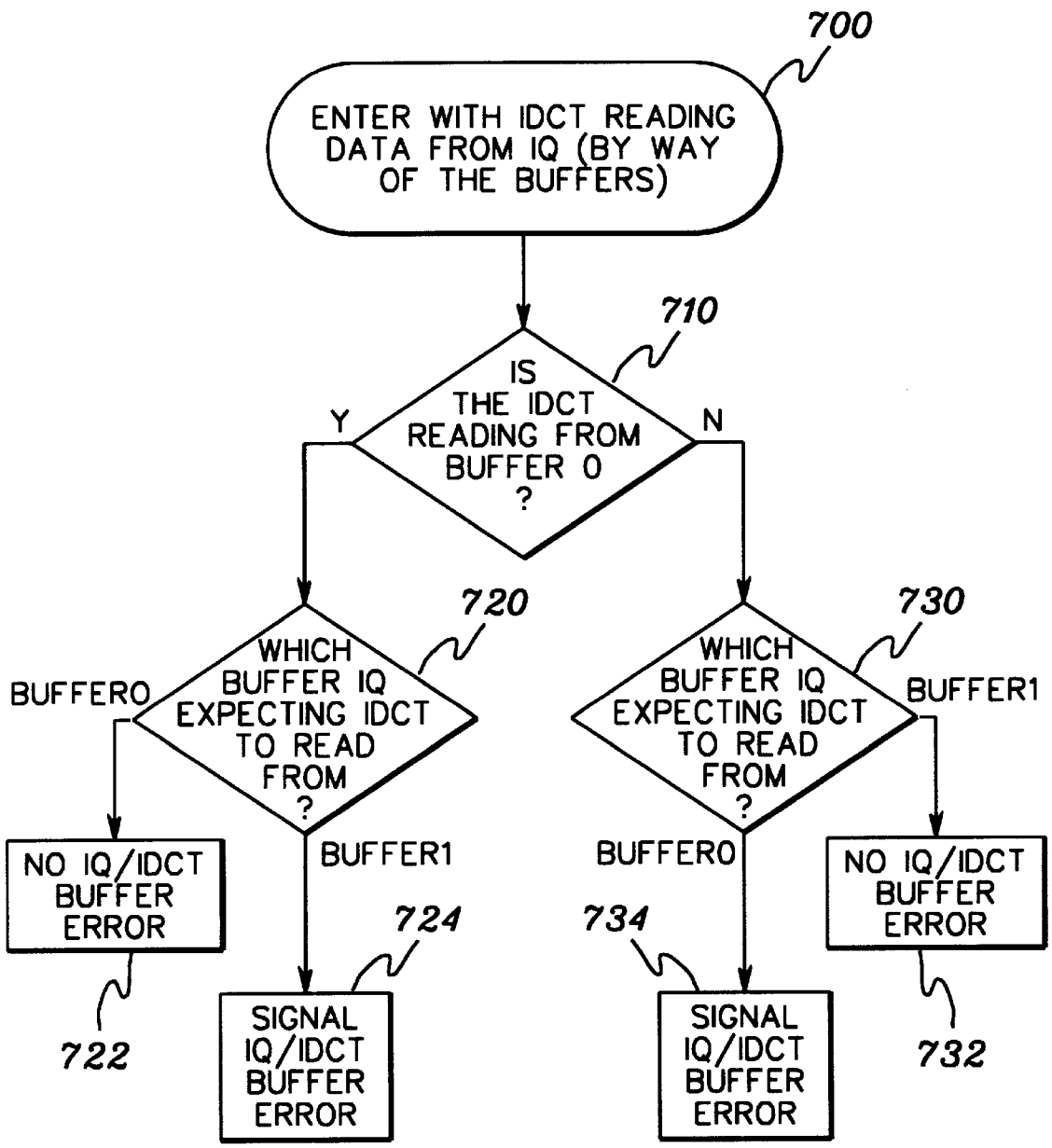
FIG. 7 is a flowchart of one embodiment of IQ/IDCT buffer error detection logic in accordance with the present invention.

As the IDCT reads each buffer by activating the appropriate buffer 0 or buffer 1 read signal, the proper buffer pointer is checked at the IQ unit against that read signal. The pointer switches according to the reset lines from the IDCT, which indicate when the IDCT has completed reading a particular buffer. FIG. 7 depicts one embodiment of logic flow for this error checking hardware.

The processing is entered with the IDCT reading data from the IQ (by way of buffer 0 or buffer 1) 700, and initially inquires whether the IDCT is reading from buffer 0 710. If "yes", then the logic inquires whether the IQ is expecting the IDCT to be reading from buffer 0 720. If "yes" again, no IQ/IDCT buffer error has occurred 722. Otherwise, if the IQ is expecting the IDCT to be reading from buffer 1, an IQ/IDCT buffer error has been identified which is signaled back to the error register 724.

At inquiry 710, if the IDCT is reading from buffer 1, then logic determines whether the IQ is expecting the IDCT to be reading from buffer 1 730. If "yes", no IQ/IDCT buffer error has occurred 732. If, on the other hand, the IQ is expecting the IDCT to be reading from buffer 0, then an IQ/IDCT error is signaled to the error register 734.

MC Idle Error Detection

The motion compensation (MC) unit is the final stage in the decoder pipeline and serves to merge the IQ/IDCT data blocks together with reconstructed picture data from reference pictures of the encoded digital signal. This merged data is then stored to memory as the final picture data for display.

As such, the MC unit must maintain a synchronous condition between the reconstructed (motion compensated) picture process and the IQ/IDCT pipeline process to ensure valid output data and prevent a "hang" or stoppage condition. To this end, an MC idle error detection check (as well as an MC macroblock start check) is added in accordance with the present invention as explained below.

During normal operation, the VLC decode will parse the input bit stream and pass run-length/level data into the pipe through the VLC/IQ FIFO. This FIFO is drained as the data is used by the IQ ultimately to generate IDCT blocks which are passed to the MC unit. Before the above process, the input bit stream also starts off a microcode/MC process to generate motion compensated picture data for a macroblock. At the time the motion compensation process completes, the IDCT blocks for the same macroblock should be generated and ready to be combined. The resultant picture data is then stored to memory for display. This in turn drains the back-end of the pipe so that more IDCT blocks can be processed and the VLC decoder can continue parsing the input bit stream and feeding data into the VLC/IQ FIFO.

Detection of the MC idle error condition indicates that the above process is far enough out of sync that a stoppage is eminent. This error condition is detected in accordance with the present invention when the MC unit is in an idle state and the VLC/IQ FIFO is full. In this case, microcode has not signaled the MC unit to perform any macroblock motion compensation level processes. As a result, the MC unit is waiting in an idle state. At the same time, however, the VLC/IQ/IDCT pipe is full with block data previously parsed out of the bit stream. At this point, the VLC decoder cannot continue to parse the bit stream since the VLC/IQ FIFO is full and it has no place to store the parsed data. The FIFO full condition halts the processor, hence the microcode will never receive any indication to begin macroblock processing, which would activate the MC unit and drain the pipe.

In accordance with the invention, an active MC idle error condition preferably blocks a VLC/IQ FIFO full indication. By blocking this full indication, halting of the processor is interrupted, which allows the processor to complete the current macroblock. After finishing processing of the macroblock, the processor will interrogate the error register to determine if an error has occurred, and if so, will take appropriate recovery action.

As a result of detection of an MC idle error, however, the pipe's VLC, IQ, IDCT, and MC units can be reset, which clears all IDCT blocks in the pipe and resynchronizes the logic/processes. And, although some picture data may be lost, the possibility of a decoder hang is averted. It should also be noted that this is a drastic condition which should not occur under normal processing, especially considering the other error checking logic presented herein. From experience, this type of condition is only achieved gradually, for example, over a number of macroblocks, and does not occur instantaneously. The other error conditions documented herein are precursors to this error and should cause a reset/resync before this particular fatal situation occurs.

Figure 8:
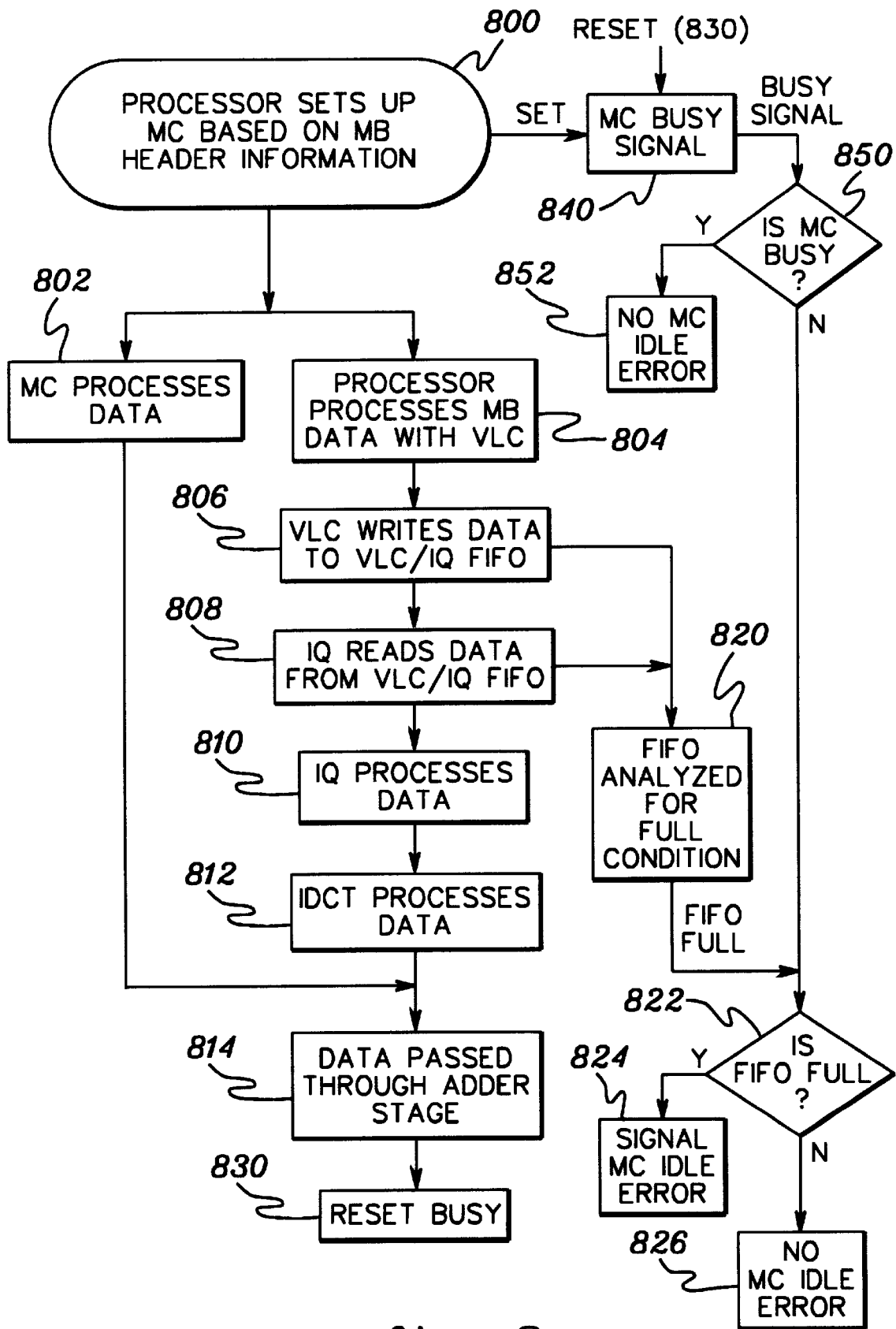
FIG. 8 is a flowchart of one embodiment of MC idle error detection logic in accordance with the present invention.

FIG. 8 presents one embodiment of MC idle error detection processing in accordance with the invention. The processor initially sets up the motion compensation unit based on the macroblock header information 800. The motion compensation unit then processes data 802 from the bit stream in parallel with the VLC decode/IQ/IDCT pipeline. Specifically, the processor initially processes the macroblock data within the VLC decoder 804. The VLC decoder writes data to the VLC/IQ FIFO 806 and the IQ reads the data from the FIFO buffer 808. The IQ processes the data as summarized above 810, which is followed by IDCT processing of the data 812. Data from the MC unit and the VLC/IQ/IDCT pipeline is then combined in the adder stage 814.

In accordance with this embodiment of the invention, an MC busy signal is set 840 by the processor upon setup of the MC based on the MB header information. The busy signal is passed to an inquiry box, "MC busy ?" 850. If "yes", then there is no motion compensation idle error 852. If the MC is not busy, inquiry is made to whether the FIFO is full 822. The full condition is analyzed by logic 820 which monitors the writing of data to the FIFO by the VLC decoder and the reading of data from the FIFO by the IQ. If the FIFO is full and the MC unit is not busy, then an MC idle error 824 has occurred and error is signaled to the error register. If the FIFO is not full, then there is no MC idle error 826. The MC busy signal is reset 830 once the macroblock of data has passed through the adder stage 814.

MC Macroblock Start Error Detection

Based on the macroblock type and chroma format, the MC unit can determine how many blocks of IDCT data it should receive per macroblock. This number will be either 0 (motion only), 6 (4:2:0 chroma), or 8 (4:2:2 chroma). The MC unit and the IDCT logic use a "data valid" pulse and a "start MB" sync pulse on their interface to signal the beginning of a 64 coefficient block of IDCT data and the first block of a set for the MB being processed, respectively. Using these signals, the MC unit can count the number of blocks (data valids) received between macroblock start sync points (Start MB). If an incorrect number of blocks are received for the MB being processed, an error signal is generated. This error indicates a problem in the bit stream and/or pipe that generated an insufficient/excessive number of blocks for an MB and shows the initial point where the MC unit processes become out of synch. At this point, the output picture data is known to be incorrect, since the IDCT blocks are mismatched within the MB. This will not directly result in a decoder "hang" situation due to the buffering capacity within the pipe. However, if the situation is not detected and corrected, and the condition reoccurs, a "hang" will eventually result with the pipe's buffering capacity being exceeded.

As a result of this error, the pipe's VLC decoder, IQ, IDCT, and MC units are reset, which clears all IDCT blocks in the pipe and resynchronizes the logic/processes. Again, some picture data will be lost (one or two MBs contained in the pipe when the error is detected), but the possibility of a decoder "hang" is averted.

Figure 9:
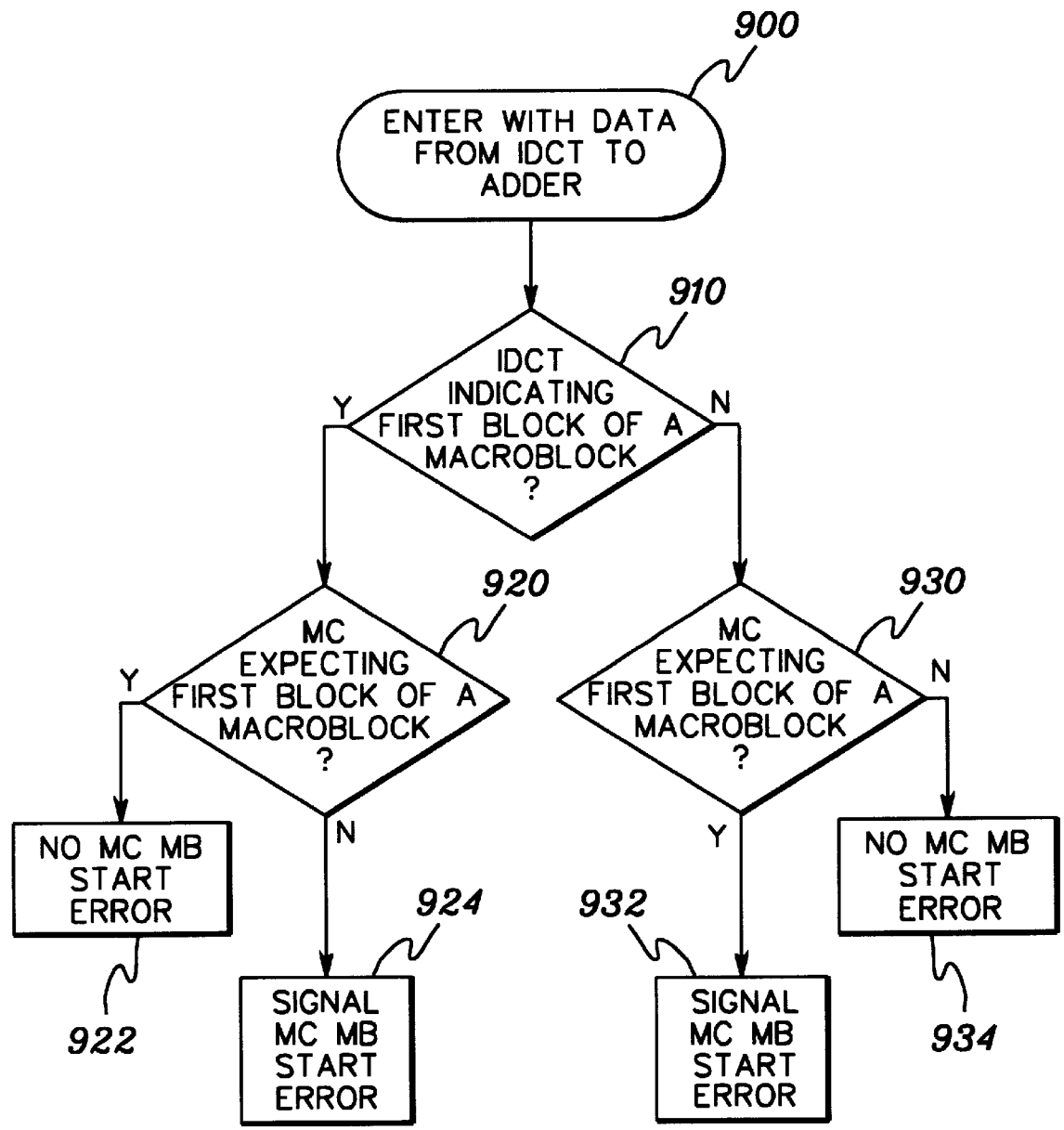
FIG. 9 is a flowchart of one embodiment of MC macroblock start error detection logic in accordance with the present invention.

FIG. 9 depicts one embodiment of MC macroblock start error detection logic in accordance with the present invention. This processing, which is entered when data is transferred from the IDCT to the adder 900, initially determines whether the IDCT indicates that the data is a first block of a macroblock. If "yes", then the logic determines whether the MC unit is expecting the IDCT to be sending the first block of a macroblock 920. If it is, then there is no motion compensation macroblock start error 922. Otherwise, an MC MB start error is signaled and an appropriate latch in the error register is set 924.

If the IDCT is not indicating that the data comprises a first block of a macroblock, then the error detection logic determines whether the motion compensation unit is expecting the IDCT to be sending the first block of a macroblock 930. If not, there is no MC macroblock start error 934. Otherwise, an error has occurred since the MC unit is expecting the first block of a macroblock and the IDCT is signaling that the data comprises other than the first block of a macroblock. The MC macroblock start error is signaled 932 to the error register in the VLC decoder.

VLC Error Control Register

Any errors generated by logic implemented in accordance with the present invention (as summarized above) are reported to the microcode on the control processor by way of an error register or VLC_CNTRL register. When microcode finds a reported error in the register, the processor can reset the affected hardware units. The bad macroblocks can then be recovered from previous pictures in accordance with processings known in the art. One implementation for the VLC_CNTRL register is presented in Table 4.

TABLE 4

| bit | vlc_cntrl register | definition |
|---|---|---|
| 1 | mc_mbstart_error | mc found a MB start at the wrong time |
| 2 | mc_idle_error | mc idle and vlc/iq fifo full |
| 3 | iq_idct_buf_err | idct read out of wrong iq buffer |
| 4 | iq_ctl_error | the iq received control data at the wrong time |
| 5 | iq_lvl_overrun | iq received more than 64 coeffs for a block |
| 6 | vlc_tab_error | vlc found a bad table decode |

When there is an error in the compressed bit stream, it is important that the decoder does not "hang" while decoding the error. Error detection in accordance with this invention assures that corrupted data does not put the decoder into this hang condition. By periodically checking the VLC_CNTRL register, the controller's microcode can determine if an illegal condition has occurred and reset the appropriate units if necessary before stoppage of the system. Preferably, there are two sets of circuitry in the VLC to guard against the processor hanging during error detection. The first is activated when the VLC decoder detects an error in the VLC tables. When this error is active, the VLC decoder will force an end of block (EOB) into the VLC/IQ FIFO when the microcode is reading AC coefficient data. Even though the compressed data is bad, the processor can complete all the associated blocks of a macroblock.

The second set of logic will allow the processor to finish processing a macroblock if one of the downstream units (IQ, IDCT, MC) has found an error, i.e., when either mc_mbstart_error, mc_idle_error, iq_idct_buf_err, iq_ctl_error, or iq_lvl_overrun (VLC_CNTRL register) is active, the VLC decoder ensures that the processor will not hang. These errors may cause one of the downstream units to stop processing macroblock data. This data stoppage will sooner or later cause the VLC/IQ FIFO to fill up, which in turn will cause the VLC to halt the processor. Preferably, these errors will cause the VLC to ignore any VLC/IQ FIFO full indications so that the processor can finish the processing of the macroblock.

As a further enhancement, disable bits may also be provided in the VLC_CNTRL register to give the microcode the ability to degate a particular error bit usage in the hardware. As noted above, the error bits preferably cause two actions to happen in the hardware; namely, they force an end of block for AC coefficients; and block the FIFO full line from the VLC/IQ FIFO. When the disabled bit is active, it blocks the associated error bit from causing this hardware action to happen. At the end of the macroblock, the microcode will check the VLC_CNTRL register, and if there are any errors in it will reset the hardware units.

Figure 10:
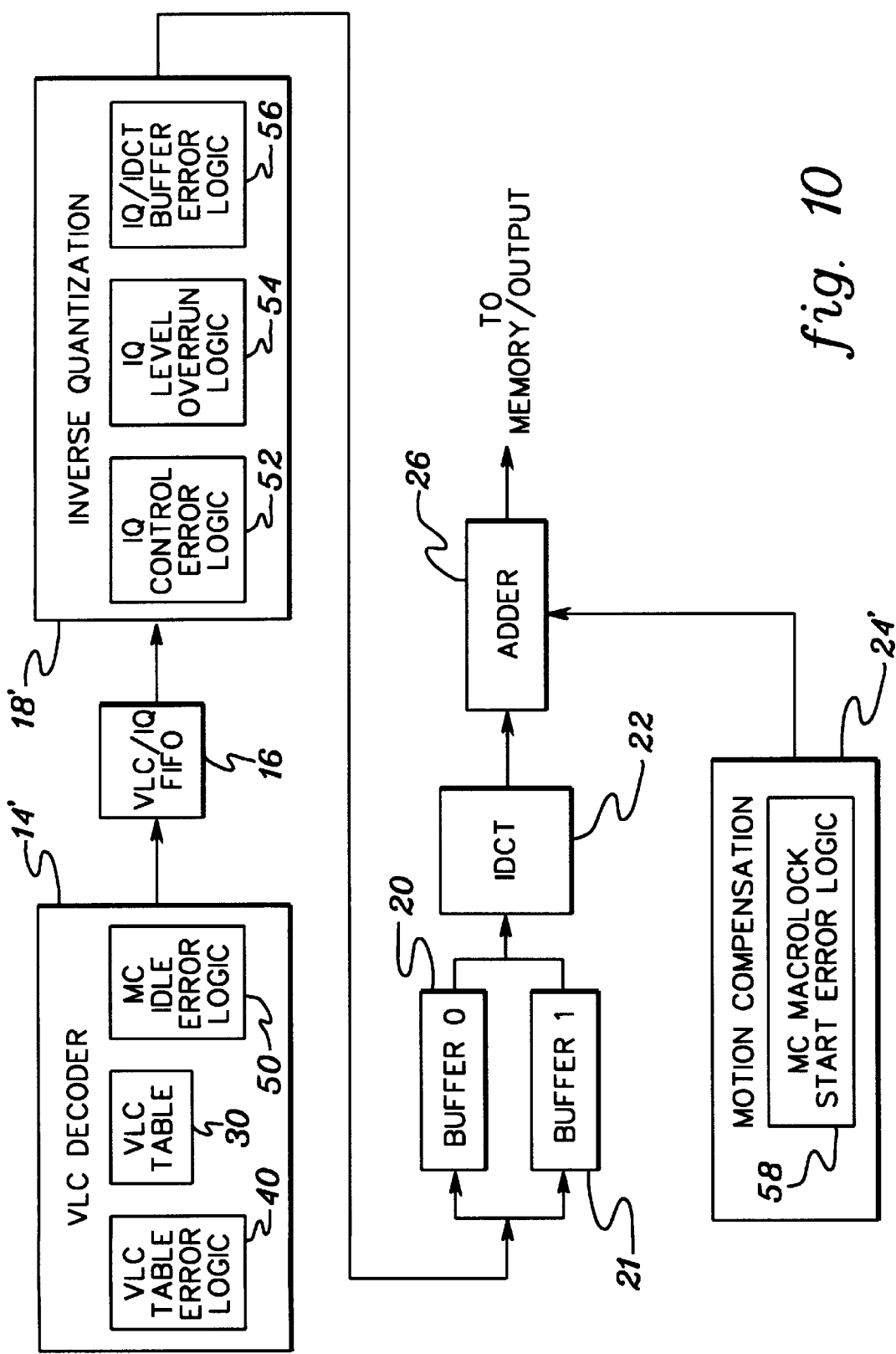
FIG. 10 is a block diagram of relevant functional units of the MPEG decoder of FIG. 1 depicting placement of the various error detection logic blocks in accordance with one embodiment of the present invention.

FIG. 10 depicts one embodiment for placement of the error logic described hereinabove. As shown, the VLC table error logic 40 can be placed within the VLC decoder 14', which also preferably contains the error register 45 and the VLC tables 30. The motion compensation idle error logic 50 is also disposed within the VLC decoder 14'.

The inverse quantization unit 18' contains IQ control error logic 52, IQ level overrun logic 54, and IQ/IDCT buffer error logic 56, while the motion compensation unit 24' is shown to contain the MC macroblock start error logic 58. Appropriate signal paths from each of the error logic blocks 40, 50, 52, 54, 56 & 58 would feed back to error register 45 within the VLC decoder 14'. Error logic placement within FIG. 10 is shown for purposes of example only. Those skilled in the art will recognize that various ones of the error logic blocks could be implemented in other hardware units within the MPEG decoder or even external to the VLC decoder, IQ, IDCT & MC units.

Those skilled in the art will note from the above discussion that presented herein are various types of error checking logic for use in a decoder system such as an MPEG video decoder. Error detection in accordance with the invention provides an ability to detect errors early in their onset so that recovery procedures can be implemented where minimal impact to the decoded picture is observed. Further, protection is provided against errors accumulating and causing catastrophic failures such as would manifest themselves as picture corruption or even stoppage of the decoding process. Errors are detected originating in either the compressed data or caused by decoder hardware malfunctions. Further, error detection logic is described for insuring that the decoder units are processing the correct macroblock at a particular time. The particular error detection logic described detects VLC table errors, IQ control errors, IQ level overruns, IQ/IDCT buffer errors, MC idle errors and/or MC macroblock start errors.

The present invention can be included in an article of manufacture (e.g., one or more computer program products) having, for instance, computer useable media. The media has embodied therein, for instance, computer readable program code means for providing and facilitating the capabilities of the present invention. The articles manufactured can be included as part of the computer system or sold separately.

The flow diagrams depicted herein are provided by way of example. There may be variations to these diagrams or the steps or operations described herein without departing from the spirit of the invention. For instance, in certain cases the steps may be performed in differing order, or steps may be added, deleted or modified. All these variations are considered to comprise part of the present invention as recited in the appended claims.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

We claim:

1. An MPEG digital video decoder system for decoding an encoded digital video signal, said system comprising:
    a variable length code (VLC) decoder for receiving encoded data of the encoded digital video signal and for producing therefrom decoded data;
    an inverse quantizer (IQ) coupled to the VLC decoder for dequantizing the decoded data to produce therefrom dequantized, decoded data;
    a discrete cosine transform inverter (IDCT) coupled to the IQ for transforming the dequantized, decoded data from frequency domain to spatial domain, said spatial domain, dequantized decoded data including difference data;
    a motion compensator (MC) and adder for receiving reference data within the encoded digital video signal and said difference data from the IDCT to form motion compensated pictures therefrom; and
    error detection logic coupled to at least one of said VLC decoder, IQ, IDCT and MC for detecting an illegal condition within at least one of said IQ, IDCT and MC during decoding of said encoded digital video signal, wherein said illegal condition comprises at least one of a VLC decoder fixed table error, a VLC/IQ control error, an IQ level overrun, an IQ/IDCT buffer error, a MC idle error and a MC macroblock start error.

2. The MPEG digital video decoder system of claim 1, wherein said illegal condition comprises a VLC/IQ control error, and wherein said error detection logic comprises logic for comparing a VLC decoder "control information" signal with whether said IQ is expecting control information from the VLC decoder, and for signaling an error if said comparison is other than a match.

3. The MPEG digital video decoder system of claim 2, wherein said error detection logic is implemented within said IQ.

4. The MPEG digital video decoder system of claim 1, wherein said illegal condition comprises an IQ level overrun, and wherein said decoded data produced by said VLC decoder comprises run/level data, and wherein said error detection logic comprises logic for maintaining a current DCT coefficient index from run data of said run/level data provided by said VLC decoder, and for signaling an error if said current DCT coefficient index exceeds a predefined block size before an end of block signal.

5. The MPEG digital video decoder system of claim 4, wherein said error detection logic is implemented within said IQ.

6. The MPEG digital video decoder system of claim 1, wherein said illegal condition comprises an IQ/IDCT buffer error, and wherein said decoder system further comprises at least two buffers coupled between said IQ and said IDCT, and wherein said IQ and said IDCT further comprise means for alternating writing to and reading from said at least two buffers, and wherein said error detection logic further comprises logic to detect when said IDCT is reading from a different buffer than expected by said IQ.

7. The MPEG digital video decoder system of claim 6, wherein said error detection logic is implemented within said IQ, and wherein said system further comprises means for providing a signal from the IDCT to the IQ indicative of which buffer the IDCT is currently reading.

8. The MPEG digital video decoder system of claim 1, wherein said illegal condition comprises an MC idle error, said MC idle error occurring when said MC is in idle state and a buffer coupling said VLC decoder and said IQ is full, and wherein said error detection logic comprises means for signaling an error upon detection of said buffer coupling said VLC decoder and said IQ being full while said MC is in idle state.

9. The MPEG digital video decoder system of claim 8, wherein said error detection logic is implemented within said VLC decoder.

10. The MPEG digital video decoder system of claim 1, wherein said illegal condition comprises an MC macroblock start error, said MC macroblock start error occurring when said MC either is expecting a macroblock start signal from said IDCT and receives other than said macroblock start signal from said IDCT or is expecting other than a macroblock start signal from said IDCT and receives said macroblock start signal from said IDCT.

11. The MPEG digital video decoder system of claim 10, wherein said error detection logic for detecting said MC macroblock start error is implemented within said MC.

12. The MPEG digital video decoder system of claim 1, further comprising an error register coupled to said error detection logic, and a control processor coupled to at least some of said VLC decoder, IQ, IDCT and MC, and wherein said error detection logic records an error signal in said error register upon detecting said illegal condition, and said control processor is coupled to said error register for monitoring said error register for said error signal.

13. The MPEG digital video decoder system of claim 12, further comprising recovery microcode at said control processor for recovering from a detected illegal condition occurring in at least one of said IQ, IDCT and MC, said recovery microcode comprising means for recovering from said detected illegal condition prior to a stoppage of said MPEG digital video decoder system due to said illegal condition.

14. The MPEG digital video decoder system of claim 12, wherein said error detection logic comprises means for detecting any one of multiple potential illegal conditions within said IQ, IDCT and MC, said multiple potential illegal conditions comprising at least some of a VLC/IQ control error, an IQ level overrun, an IQ/IDCT buffer error, an MC idle error and an MC macroblock start error.

15. An MPEG digital video decoder system for decoding an encoded digital video signal, said system comprising:
   a variable length code (VLC) decoder for receiving encoded data of the encoded digital video signal and for producing therefrom decoded data;
   an inverse quantizer (IQ) coupled to the VLC decoder for dequantizing the decoded data to produce therefrom dequantized, decoded data;
   a discrete cosine transform inverter (IDCT) coupled to the IQ for transforming the dequantized, decoded data from frequency domain to spatial domain, said spatial domain, dequantized decoded data including difference data;
   a motion compensator (MC) and adder for receiving reference data within the encoded digital video signal and said difference data from the IDCT to form motion compensated pictures therefrom;
   error detection logic coupled to at least one of said VLC decoder, IQ, IDCT and MC for detecting an illegal condition within at least one of said IQ, IDCT and MC during decoding of said encoded digital video signal;
   an error register coupled to said error detection logic, and a control processor coupled to at least some of said VLC decoder, IQ, IDCT and MC, and wherein said error detection logic records an error signal in said error register upon detecting said illegal condition, and said control processor is coupled to said error register for monitoring said error register for said error signal; and
   wherein said error register is located within said VLC decoder.

16. An MPEG digital video decoder system for decoding an encoded digital video signal, said system comprising:
   a variable length code (VLC) decoder for receiving encoded data of the encoded digital video signal and for producing therefrom decoded data;
   an inverse quantizer (IQ) coupled to the VLC decoder for dequantizing the decoded data to produce therefrom dequantized, decoded data;
   a discrete cosine transform inverter (IDCT) coupled to the IQ for transforming the dequantized, decoded data from frequency domain to spatial domain, said spatial domain, dequantized decoded data including difference data; p1 a motion compensator (MC) and adder for receiving reference data within the encoded digital video signal and said difference data from the IDCT to form motion compensated pictures therefrom;
   error detection logic coupled to at least one of said VLC decoder, IQ, IDCT and MC for detecting an illegal condition within at least one of said IQ, IDCT and MC during decoding of said encoded digital video signal;
   an error register coupled to said error detection logic, and a control processor coupled to at least some of said VLC decoder, IQ, IDCT and MC, and wherein said error detection logic records an error signal in said error register upon detecting said illegal condition, and said control processor is coupled to said error register for monitoring said error register for said error signal;
   further comprising recovery microcode at said control processor for recovering from a detected illegal condition occurring in at least one of said IQ, IDCT and MC, said recovery microcode comprising means for recovering from said detected illegal condition prior to a stoppage of said MPEG digital video decoder system due to said illegal condition; and
   wherein said VLC decoder is coupled to said IQ a cross a VLC/IQ buffer, and wherein said recovery microcode further comprises means for causing said VLC decoder to ignore a VLC/IQ buffer full indication after said illegal condition is detected within said at least one of said IQ, IDCT and MC.

17. An MPEG digital video decoder system for decoding an encoded digital video signal, said system comprising:
   a variable length code (VLC) decoder for receiving encoded data of the encoded digital video signal and for producing therefrom decoded data;
   an inverse quantizer (IQ) coupled to the VLC decoder for dequantizing the decoded data to produce therefrom dequantized, decoded data;
   a discrete cosine transform inverter (IDCT) coupled to the IQ for transforming the dequantized, decoded data from frequency domain to spatial domain, said spatial domain, dequantized decoded data including difference data;
   a motion compensator (MC) an adder for receiving reference data within the encoded digital video signal and said difference data from the IDCT to form motion compensated pictures therefrom; and
   error detection logic coupled to said VLC decoder for detecting an illegal condition within the VLC decoder, said illegal condition comprising a VLC decoder table error, and wherein said detection logic further comprises logic for determining whether a subject table in the VLC decoder comprises a fixed length, open table, and if so, for determining whether a fixed length of compressed data of a given decode of said encoded data comprises a forbidden entry in the fixed length open table, and wherein said VLC table error detection logic further comprises logic for signalling an error upon detection of said forbidden entry.

18. A method for decoding an encoded digital video signal employing an MPEG digital video decoder system having a variable length code (VLC) decoder, an inverse quantizer (IQ), a discrete cosine transform inverter (IDCT), and a motion compensator (MC), said method comprising:
(a) receiving encoded data of the encoded digital video signal at the VLC decoder and producing therefrom decoded data;
(b) dequantizing the decoded data employing the inverse quantizer to produce therefrom dequantized, decoded data;
(c) employing said IDCT for transforming the dequantized, decoded data from frequency domain to spatial domain to produce spatial domain, dequantized decoded data, said spatial domain, dequantized decoded data including difference data;
(d) receiving reference data of the encoded digital video signal at said MC and said difference data from said IDCT and employing said MC to form motion compensated pictures therefrom; and
(e) simultaneous with at least some of said steps (a)–(d), checking for an illegal condition within at least one of said IQ, IDCT and MC during decoding of said encoded digital video signal, said illegal condition comprising an illegal decode process condition comprising at least one of a VLC decoder fixed table error, an IQ control error, an IQ level overrun, an IQ/IDCT buffer error, an MC idle error and a MC macroblock start error.

19. The method of claim 18, wherein said illegal condition comprises a VLC/IQ control error, and wherein said checking (e) comprises employing the VLC decoder to signal when control information is transferred from the VLC decoder to the IQ, and further, determining whether said IQ is expecting control information from the VLC decoder when received, and for signaling said illegal condition when said signaling from said VLC decoder and said expecting of said IQ are other than a match.

20. The method of claim 18, wherein said illegal condition comprises an IQ level overrun, and wherein said checking (e) comprises maintaining a current DCT coefficient index from run data provided by said VLC decoder as part of said decoded data, and signaling an error if said current DCT coefficient index exceeds a predefined block size before an end of block.

21. The method of claim 18, wherein said IQ is coupled to said IDCT across at least two buffers, and said illegal condition comprises an IQ/IDCT buffer error, and wherein said checking (e) comprises determining when said IDCT is reading from a different buffer of said at least two buffers than expected by said IQ and signaling an error if detected.

22. The method of claim 18, wherein said illegal condition comprises an MC idle error, and wherein said checking (e) comprises signaling an error upon detecting a buffer full condition in a buffer coupling said VLC decoder and said IQ while said MC is simultaneously in an idle state.

23. The method of claim 18, wherein said illegal condition comprises an MC macroblock start error, and wherein said checking (e) comprises signaling an error when said MC either is expecting a macroblock start signal from said IDCT and receives other than said macroblock start signal from said IDCT or is expecting other than a macroblock start signal from said IDCT and receives said macroblock start signal from said IDCT.

24. The method of claim 18, digital said MPEG digital video decoder system further comprises an error register, and wherein said checking (e) comprises recording an error signal to said error register upon detecting said illegal condition.

25. The method of claim 24, wherein said MPEG digital video decoder system further comprises a control processor coupled to at least some of said VLC decoder, IQ, IDCT and MC and to said error register, and wherein said method further comprises employing said control processor to monitor said error register for said error signal.

26. The method of claim 25, further comprising recovering from said illegal condition upon detection of said error signal, said recovering occurring prior to stoppage of said decoding of the encoded digital video signal employing the MPEG digital video decoder system.

27. A method for decoding an encoded digital video signal employing an MPEG digital video decoder system having a variable length code (VLC) decoder, an inverse quantizer (IQ), a discrete cosine transform inverter (IDCT), and a motion compensator (MC), said method comprising:
(a) receiving encoded data of the encoded digital video signal at the VLC decoder and producing therefrom decoded data;
(b) dequantizing the decoded data employing the inverse quantizer to produce therefrom dequantized, decoded data;
(c) employing said IDCT for transforming the dequantized, decoded data from frequency domain to spatial domain to produce spatial domain, dequantized decoded data, said spatial domain, dequantized decoded data including difference data;
(d) receiving reference data of the encoded digital video signal at said MC and said difference data from said IDCT and employing said MC to form motion compensated pictures therefrom; and
(e) simultaneous with at least some of said steps (a)–(d), checking for an illegal condition within said VLC decoder, said illegal condition comprising a VLC decoder table error, and wherein said checking further comprises determining whether a subject table of the VLC decoder comprises a fixed length open table, and if so, determining whether a fixed length of compressed data of a given decode of said encoded data comprises a forbidden entry in the fixed length open table, and signalling an error upon detection of said forbidden entry using said fixed length of compressed data of the given decode.

28. A computer program product for monitoring decoding of an encoded digital video signal employing an MPEG digital video decoder system having a variable length code (VLC) decoder, an inverse quantizer (IQ), a discrete cosine transform inverter (IDCT), and a motion compensator (MC), said VLC decoder receiving encoded data of the encoded digital video signal and producing therefrom decoded data, said IQ dequantizing the decoded data to produce therefrom dequantized, decoded data, said IDCT transforming the dequantized, decoded data from frequency domain to spatial domain, said MC receiving reference data of the encoded digital video signal and difference data from the IDCT and producing therefrom motion compensated pictures, said computer program product comprising:
a computer useable medium having computer readable program code means embodied in said medium for monitoring decoding of the encoded digital video signal within said MPEG digital video decoder system, said computer program product having:

computer readable program code means for causing said computer to detect a predefined illegal condition occurring within at least one of said IQ, IDCT and MC; and computer readable program code means for causing said computer to signal an error upon detection of said predefined illegal condition, wherein said predefined illegal condition comprises at least one of a VLC decoder fixed table error, an IQ control error, an IQ level overrun, an IQ/IDCT buffer error, a MC idle error and a MC macroblock start error.

29. The computer program product of claim 28, wherein the predefined illegal condition comprises one of a VLC/IQ control error, an IQ level overrun, an IQ/IDCT buffer error, an MC idle error, and an MC macroblock start error.

30. The computer program product of claim 28, wherein said computer readable program code means for causing said computer to detect said predefined illegal condition comprises computer readable program code means for causing said computer to detect multiple predefined illegal conditions, and wherein said multiple predefined illegal conditions comprise at least some of a VLC/IQ control error, an IQ level overrun, an IQ/IDCT buffer error, an MC idle error and an MC macroblock start error.

31. The computer program product of claim 28, further comprising computer readable program code means for causing said computer to recover from the predefined illegal condition prior to stoppage of decode processing within the MPEG digital video decoder system due to occurrence said predefined illegal condition.

32. A computer program product for monitoring decoding of an encoded digital video signal employing an MPEG digital video decoder system having a variable length code (VLC) decoder, an inverse quantizer (IQ), a discrete cosine transform inverter (IDCT), and a motion compensator (MC), said VLC decoder receiving encoded data of the encoded digital video signal and producing therefrom decoded data, said IQ dequantizing the decoded data to produce therefrom dequantized, decoded data, said IDCT transforming the dequantized, decoded data from frequency domain to spatial domain, said MC receiving reference data of the encoded digital video signal and difference data from the IDCT and producing therefrom motion compensated pictures, said computer program product comprising:

a computer useable medium having computer readable program code means embodied in said medium for monitoring decoding of the encoded digital video signal within said MPEG digital video decoder system, said computer program product having:

computer readable program code means for causing said computer to detect a predefined illegal condition occurring within said VLC decoder, said predefined illegal condition comprising a VLC decoder table error, wherein said computer readable program code means for causing said computer to detect said predefined illegal condition comprises computer readable program code means for causing said computer to determine whether a subject table in the VLC decoder comprises a fixed length open table, and if so, for determining whether a fixed length of compressed data of a given decode of said encoded data comprises a forbidden entry in the fixed length open table, and signalling an error upon detection of said forbidden entry using said fixed length of compressed data of the given decode; and computer readable code means for causing said computer to signal an error upon detection of said predefined illegal condition.

* * * * *

UNITED STATES PATENT AND TRADEMARK OFFICE
CERTIFICATE OF CORRECTION

PATENT NO. : 6,052,415
DATED : April 18, 2000
INVENTOR(S) : Carr et al.

It is certified that error appears in the above-identified patent and that said Letters Patent is hereby corrected as shown below:

IN THE CLAIMS:

Claim 16, Col. 18, line 11, delete "p1" and start a separate paragraph at "a motion compensator".

Claim 24, Col. 20, line 1, delete ",digital" and replace with --, wherein--.

Signed and Sealed this

Sixth Day of March, 2001

Attest:

NICHOLAS P. GODICI

Attesting Officer    Acting Director of the United States Patent and Trademark Office